United States Patent
Mottram et al.

(10) Patent No.: US 11,619,522 B2
(45) Date of Patent: Apr. 4, 2023

(54) CALIBRATING POSITION SENSOR READINGS

(71) Applicant: CMR SURGICAL LIMITED, Cambridge (GB)

(72) Inventors: Edward James Mottram, Cambridge (GB); Paul Christopher Roberts, Cambridge (GB)

(73) Assignee: CMR SURGICAL LIMITED, Cambridge (GB)

( * ) Notice: Subject to any disclaimer, the term of this patent is extended or adjusted under 35 U.S.C. 154(b) by 106 days.

(21) Appl. No.: 17/194,208

(22) Filed: Mar. 5, 2021

(65) Prior Publication Data

US 2021/0190547 A1    Jun. 24, 2021

Related U.S. Application Data

(63) Continuation of application No. 16/319,289, filed as application No. PCT/GB2017/052120 on Jul. 19, 2017, now Pat. No. 10,969,251.

(30) Foreign Application Priority Data

Jul. 22, 2016    (GB) ..................... 1612766

(51) Int. Cl.
   *G01D 5/244*    (2006.01)
   *G01D 5/245*    (2006.01)
   (Continued)

(52) U.S. Cl.
   CPC .......... *G01D 5/2449* (2013.01); *G01D 5/145* (2013.01); *G01D 5/20* (2013.01); *G01D 5/2053* (2013.01);
   (Continued)

(58) Field of Classification Search
   CPC ........ G01D 5/2449; G01D 5/145; G01D 5/20; G01D 5/2053; G01D 5/24471;
   (Continued)

(56) References Cited

U.S. PATENT DOCUMENTS 5,568,048 A    10/1996 Schroeder
5,739,659 A    4/1998 Ezuka
(Continued)

FOREIGN PATENT DOCUMENTS

| CN | 105492869 A | 4/2016 | |
|----|----|----|----|
| CN | 105674873 B | * 11/2019 | ............... G01B 7/30 |

(Continued)

OTHER PUBLICATIONS

EP 20185923 Written Opinion—english translation (Year: 2022).*
(Continued)

*Primary Examiner* — Jermele M Hollington
*Assistant Examiner* — Sean Curtis

(57) ABSTRACT

A method of correcting a position reading from a position sensing arrangement. The position sensing arrangement is suitable for sensing the position of a revolute joint of an articulated structure, and comprises a disc having a magnetic ring with magnetic pole pairs and a magnetic sensor assembly comprising a magnetic sensor array for detecting the magnetic pole pairs of the magnetic ring. The method comprises: for each pole pair of the magnetic ring, taking a calibration pole pair position reading with the magnetic sensor array, and generating a pole pair correcting function by comparing the calibration pole pair position reading with a model pole pair position reading; averaging the pole pair correcting functions of the pole pairs of the magnetic ring to generate an average pole pair correcting function for the magnetic ring; taking a position reading with the magnetic sensor array, the position reading comprising a plurality of
(Continued)

pole pair position readings; and generating a corrected position reading by deducting the average pole pair correcting function from each pole pair position reading.

11 Claims, 10 Drawing Sheets

(51) Int. Cl.
G01D 18/00 (2006.01)
G01D 5/14 (2006.01)
G01D 5/20 (2006.01)
G01D 5/249 (2006.01)

(52) U.S. Cl.
CPC .......... *G01D 5/245* (2013.01); *G01D 5/2452* (2013.01); *G01D 5/2497* (2013.01); *G01D 5/24471* (2013.01); *G01D 5/24495* (2013.01); *G01D 18/00* (2013.01)

(58) Field of Classification Search
CPC .. G01D 5/24495; G01D 5/245; G01D 5/2452; G01D 5/2497; G01D 18/00
USPC ............................... 324/202, 207.11–207.13
See application file for complete search history.

(56) References Cited

U.S. PATENT DOCUMENTS

| | | | |
|---|---|---|---|
| 5,757,180 A | 5/1998 | Chou | |
| 5,779,405 A | 7/1998 | Aiso | |
| 6,515,471 B1 | 2/2003 | Santos | |
| 8,253,413 B2 | 8/2012 | Hammerschmidt | |
| 8,305,073 B2 * | 11/2012 | Kather | G01B 7/30 324/207.2 |
| 8,466,672 B2 | 6/2013 | Dixon | |
| 9,240,800 B2 | 1/2016 | Hammerschmidt | |
| 9,372,062 B2 | 6/2016 | Youngner | |
| 9,389,098 B2 | 7/2016 | Hammerschmidt | |
| 9,431,939 B2 | 8/2016 | Burke | |
| 9,766,095 B2 * | 9/2017 | Hara | G01D 5/145 |
| 9,791,298 B2 * | 10/2017 | Kadoike | G01B 21/045 |
| 9,823,094 B2 | 11/2017 | Takahashi | |
| 9,852,832 B2 | 12/2017 | Sirohiwala | |
| 9,970,783 B2 * | 5/2018 | Ikeda | G01D 5/14 |
| 10,048,718 B2 | 8/2018 | Sirohiwala | |
| 10,052,761 B2 | 8/2018 | Langenfeld | |
| 10,248,154 B2 | 4/2019 | Sirohiwala | |
| 10,274,349 B2 | 4/2019 | Nogueiera | |
| 10,309,801 B2 | 6/2019 | Schott | |
| 10,398,516 B2 | 9/2019 | Jackson | |
| 10,690,514 B2 * | 6/2020 | Kuwahara | G01D 5/2452 |
| 10,795,398 B2 | 10/2020 | Sirohiwala | |
| 10,830,612 B2 | 11/2020 | Schott | |
| 10,969,251 B2 * | 4/2021 | Mottram | G01D 5/145 |
| 11,359,907 B2 * | 6/2022 | Mottram | G01D 5/2452 |
| 2003/0145663 A1 | 8/2003 | Heisenberg | |
| 2006/0059698 A1 | 3/2006 | Staudt | |
| 2007/0132447 A1 | 6/2007 | Reimer | |
| 2009/0021246 A1 * | 1/2009 | Uehira | G01D 5/04 324/207.25 |
| 2009/0022369 A1 | 1/2009 | Satoh et al. | |
| 2010/0072988 A1 | 3/2010 | Hammerschmidt | |
| 2010/0176799 A1 | 7/2010 | Ausserlechner | |
| 2011/0187355 A1 | 8/2011 | Dixon | |
| 2012/0105055 A1 * | 5/2012 | Takahashi | F16C 41/008 324/207.25 |
| 2012/0313623 A1 | 12/2012 | Hammerschmidt | |
| 2013/0293223 A1 | 11/2013 | Youngner | |
| 2014/0265970 A1 | 9/2014 | Burke | |
| 2014/0354270 A1 | 12/2014 | Kawano et al. | |
| 2015/0226581 A1 | 8/2015 | Schott | |
| 2015/0276436 A1 | 10/2015 | Hasebe | |
| 2015/0331418 A1 * | 11/2015 | Nogueira | G05B 23/00 702/104 |
| 2015/0341812 A1 | 11/2015 | Dion | |
| 2015/0377648 A1 | 12/2015 | Sirohiwala | |
| 2016/0041010 A1 * | 2/2016 | Hara | G01D 5/2451 324/207.13 |
| 2016/0076911 A1 | 3/2016 | Hammerschmidt | |
| 2016/0138942 A1 | 5/2016 | Takahashi | |
| 2016/0202087 A1 * | 7/2016 | Kadoike | G01B 7/30 324/207.12 |
| 2016/0334830 A1 | 11/2016 | Sirohiwala | |
| 2017/0146367 A1 | 5/2017 | Sirohiwala | |
| 2017/0254666 A1 * | 9/2017 | Ikeda | G01D 5/2449 |
| 2018/0321704 A1 | 11/2018 | Sirohiwala | |
| 2019/0179357 A1 | 6/2019 | Sirohiwala | |
| 2019/0238161 A1 * | 8/2019 | Gustafsson | H03M 13/31 |
| 2019/0242724 A1 | 8/2019 | Schott | |
| 2019/0265069 A1 * | 8/2019 | Roberts | G01D 5/145 |
| 2019/0277667 A1 * | 9/2019 | Mottram | G01D 5/2053 |
| 2019/0277677 A1 | 9/2019 | Mottram | |
| 2020/0041308 A1 * | 2/2020 | Kuwahara | G01D 5/14 |
| 2020/0271479 A1 | 8/2020 | Wang | |
| 2021/0190547 A1 * | 6/2021 | Mottram | G01D 5/24495 |
| 2021/0285752 A1 * | 9/2021 | Mottram | G01D 5/2452 |

FOREIGN PATENT DOCUMENTS

| | | | |
|---|---|---|---|
| DE | 102004062118 B3 | 1/2006 | |
| DE | 102013212268 A1 | 12/2014 | |
| EP | 2450661 A1 * | 5/2012 | ............ F16C 41/007 |
| EP | 2472232 A1 | 7/2012 | |
| EP | 3029427 A1 * | 6/2016 | ........ G01D 5/24452 |
| EP | 3217531 A1 * | 9/2017 | |
| EP | 3040690 A1 | 3/2021 | |
| EP | 3488188 B1 * | 7/2021 | ............ A61B 34/30 |
| GB | 2552385 A | 1/2018 | |
| GB | 2552385 A * | 1/2018 | ............ A61B 34/30 |
| JP | 2004294145 A | 10/2004 | |
| JP | 2004309356 A | 11/2004 | |
| JP | 2006234723 A | 9/2006 | |
| JP | 201147735 A | 3/2011 | |
| JP | 2015114209 A | 6/2015 | |
| JP | 2017156266 A * | 9/2017 | ............ G01D 18/00 |
| JP | 6656958 B2 * | 3/2020 | ............ G01D 18/00 |
| WO | WO 2008020231 A2 | 2/2008 | |
| WO | WO-2008148698 A1 * | 12/2008 | ............ B82Y 25/00 |
| WO | WO 2014082677 A1 | 6/2014 | |
| WO | WO 2015004472 A2 | 1/2015 | |
| WO | 2015029098 A1 | 3/2015 | |
| WO | WO-2017013450 A1 * | 1/2017 | ............ A61B 34/70 |
| WO | WO 2018/015747 A1 | 1/2018 | |
| WO | WO-2018015750 A1 * | 1/2018 | ............ A61B 34/30 |

OTHER PUBLICATIONS

JP2019503255 Written Opinion—english translation (Year: 2022).*
PCT/GB2017/052120 Written Opinion—english translation (Year: 2022).*
Notification of Refusal in Japanese Patent Application No. 2019-503255. dated Feb. 8, 2022.
Notification of Refusal in Japanese patent application No. 2019-503225, dated May 27, 2021.
Examination Report in Indian Patent Application No. 201917006797, dated Dec. 21, 2020.
Office Action in Chinese Patent Application No. 201780045466.5, dated Nov. 3, 2020 (with English translation).
Extended European Search Report in EP 20185923.8, dated Oct. 1, 2020.
Search Report in British Application No. GB1612766.4, dated Jan. 11, 2017.

* cited by examiner

CALIBRATING POSITION SENSOR READINGS

REFERENCE TO RELATED APPLICATIONS

The present application is a continuation of U.S. patent application Ser. No. 16/319,289, filed Jan. 18, 2019, which is the national stage entry of International Application No. PCT/GB2017/052120, filed Jul. 19, 2017, which claims the benefit of priority to United Kingdom Application No. 1612766.4, filed Jul. 22, 2016, the contents of which are incorporated in their entirety herewith.

BACKGROUND

In applications involving articulated structures, it is often desirable to determine the position of the distal end of the most distal link of the articulated structure. This can be achieved by sensing the position of each link relative to the last along the articulated structure, from its base to the most distal link. This series of measurements can be used in combination with the known layout of the articulated structure to determine the position of the distal end of the most distal link relative to the base. Rotary position sensors are used to sense relative rotation between links. Linear position sensors are used to sense relative longitudinal motion between links.

Hall effect magnetic sensors are commonly used to sense relative motion between links. In a typical rotary position sensor, a ring has a set of alternating magnetic poles arranged around it. A sensor interacts with the ring, and is located so that the magnetic poles move past the sensor as the rotation that is desired to be sensed takes place. For example, the ring could be attached about a shaft and the sensor could be attached to a housing within which the shaft rotates. The sensor detects changes in magnetic polarity as the poles move past the sensor. By counting the number of changes in polarity the amount of rotation from a reference position can be sensed. To sense the direction of rotation two such pairs of rings and sensors can be provided, and arranged so that one sensor detects magnetic transitions of its ring at rotation positions that are offset from the positions where the other sensor detects magnetic transitions of its ring. By considering the relative timing of transitions detected by each sensor the direction of rotation can be sensed.

The field of robotics utilizes articulated structures as robot arms. Accurate position sensing is important for robot arms in order to ensure their end effectors are manipulated precisely as intended. The larger the magnetic rings of the position sensor, the more accurately the relative rotation of two links of the robot arm is sensed. However, in some robotics applications, for example in the field of surgical robotics, it is desirable for the position sensors to be very compact to fit within the available space and to minimize the weight that they add to the arm.

Thus, there is a need for an improved position sensor which balances the competing requirements of accuracy and compactness.

SUMMARY OF THE INVENTION

According to an aspect of the invention, there is provided a method of correcting a position reading from a position sensing arrangement, the position sensing arrangement being suitable for sensing the position of a revolute joint of an articulated structure, the position sensing arrangement comprising a disc having a magnetic ring with magnetic pole pairs and a magnetic sensor assembly comprising a magnetic sensor array for detecting the magnetic pole pairs of the magnetic ring, the method comprising: for each pole pair of the magnetic ring, taking a calibration pole pair position reading with the magnetic sensor array, and generating a pole pair correcting function by comparing the calibration pole pair position reading with a model pole pair position reading; averaging the pole pair correcting functions of the pole pairs of the magnetic ring to generate an average pole pair correcting function for the magnetic ring; taking a position reading with the magnetic sensor array, the position reading comprising a plurality of pole pair position readings; and generating a corrected position reading by deducting the average pole pair correcting function from each pole pair position reading.

The calibration pole pair position reading may be multi-bit.

The pole pair correcting function may comprise a periodically oscillating function. This periodically oscillating function may comprise a sinusoidal function.

For each pole pair, the pole pair correcting function may be generated by fitting a curve to the calibration pole pair position reading, and deducting a line representing the model pole pair position reading from the fitted curve. The curve may be fitted to the calibration pole pair position reading using a method of least squares.

Suitably, the disc comprises a further magnetic ring with magnetic pole pairs, and the magnetic sensor assembly comprises a further magnetic sensor array for detecting the magnetic pole pairs of the further magnetic ring, and the method comprises: for each pole pair of the further magnetic ring, taking a further calibration pole pair position reading with the further magnetic sensor array, and generating a further pole pair correcting function by comparing the further calibration pole pair position reading with the model pole pair position reading; averaging the further pole pair correcting functions of the pole pairs of the further magnetic ring to generate an average further pole pair correcting function for the further magnetic ring; taking a further position reading with the further magnetic sensor array, the further position reading comprising a plurality of pole pair position readings; and deducting the average further pole pair correcting function from each pole pair position reading to generate a corrected further position reading.

The further pole pair correcting function may comprise a periodically oscillating function. This periodically oscillating function may comprise a sinusoidal function. The further pole pair correcting function may be generated by fitting a curve to the further calibration pole pair position reading, and deducting a line representing the model pole pair position reading from the fitted curve. The curve may be fitted to the further calibration pole pair position reading using a method of least squares. The method may further comprise: for each pole pair of the magnetic ring, generating a corrected calibration pole pair position reading by deducting the pole pair correcting function from the calibration pole pair position reading; generating a revolution correcting function by comparing the corrected calibration pole pair position readings for the magnetic ring with model revolution position readings; and generating the corrected position reading by: deducting the average pole pair correcting function from each pole pair position reading; and deducting the revolution correcting function from the position reading. The revolution correcting function may comprise a periodically oscillating function. This periodically oscillating function may comprise a sinusoidal function.

The method may comprise generating the revolution correcting function by fitting a curve to the corrected calibration pole pair position readings, and deducting a line representing the model revolution position readings from the fitted curve. The curve may be fitted to the corrected calibration pole pair position readings using a method of least squares.

The method may comprise, for each pole pair of the further magnetic ring, generating a further corrected calibration pole pair position reading by deducting the further pole pair correcting function from the further calibration pole pair position reading; generating a further revolution correcting function by comparing the further corrected calibration pole pair position readings for the magnetic ring with further model revolution position readings; and generating the corrected position reading by: deducting the average further pole pair correcting function from each pole pair position reading; and deducting the further revolution correcting function from the position reading.

The further revolution correcting function may comprise a periodically oscillating function. This periodically oscillating function may comprise a sinusoidal function.

The method may comprise generating the further revolution correcting function by fitting a curve to the corrected calibration pole pair position readings, and deducting a line representing the model revolution position readings from the fitted curve. The curve may be fitted to the corrected calibration pole pair position readings using a method of least squares.

DETAILED DESCRIPTION OF THE EMBODIMENTS

The following relates to a position sensing arrangement for an articulated structure, and a method of assembling the position sensing arrangement. By sensing the position of each joint of an articulated structure, the position of the distal end of the articulated structure can be determined from a combination of the sensed joint positions and known layout of the articulated structure. In the example of a robot arm, a base of the robot arm is coupled to the end effector at the distal end of the robot arm via a series of links joined together by joints. These may be revolute joints or prismatic joints. In the case of a revolute joint, the rotation of the joint is sensed. In other words, the relative rotation of the two shafts which the revolute joint attaches is sensed. The angle of rotation and the direction of rotation are sensed. In the case of a prismatic joint, the longitudinal motion of the joint is sensed. In other words, the relative motion of the two shafts which the prismatic joint attaches is sensed. The movement distance and the direction of movement are sensed.

Figure 1:
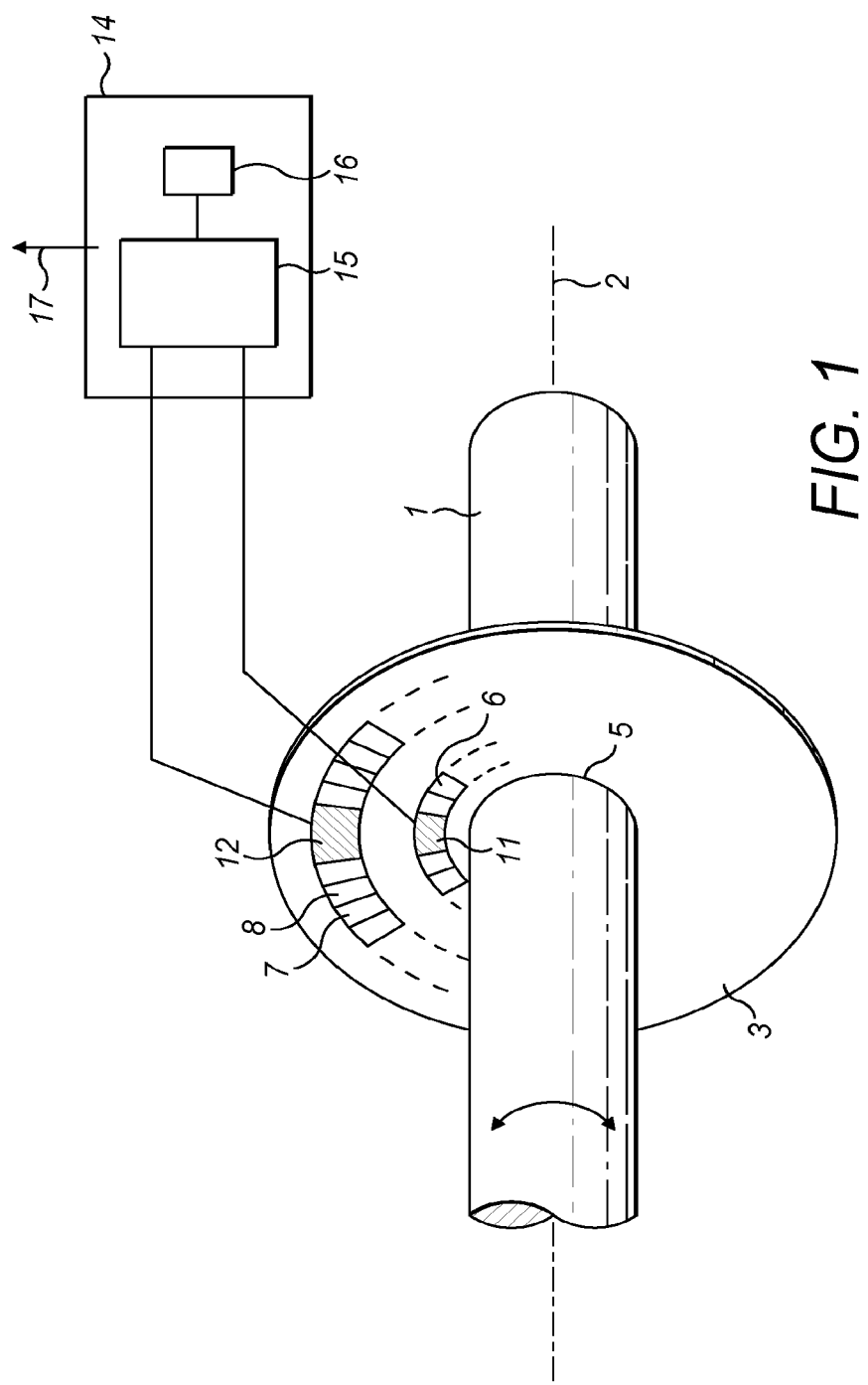
FIG. 1 illustrates a general representation of a shaft equipped with a position sensing arrangement.

FIG. 1 illustrates an example of a position sensing arrangement for detecting rotation of shaft 1 about axis 2. The position sensing arrangement detects the angle and direction of rotation of shaft 1 about axis 2. The position sensing arrangement comprises a magnetic sensor assembly and a disc 3. Disc 3 is shown in more detail on FIG. 2. Disc 3 is an annulus having an outer radial boundary 4 and an inner radial boundary 5. Both the boundaries of the annulus are centered on the center point of the disc 3. The radius of the outer radial boundary is $r_o$. The radius of the inner radial boundary is n. Disc 3 is fast with the element whose position is being sensed. In this case, disc 3 is rigidly mounted to shaft 1. There is no relative motion permitted between shaft 1 and disc 3. Disc 3 rotates about axis 2. In other words, disc 3 and shaft 1 rotate about a common axis.

Two magnetic rings 6, 7 are disposed on disc 3. The magnetic rings are not movable relative to each other. The two magnetic rings are concentric. Both magnetic rings are centered on the center of the disc. In other words, the magnetic rings are arranged in a circle having the rotation axis 2 of shaft 1 as its axis. The radial distance between the center of the disc and the centerline 9 of the inner magnetic ring 6 is $r_m$. The radial distance between the center of the disc and the centreline 10 of the outer magnetic ring 7 is $r_n$. The centerlines 9, 10 of the magnetic rings 6, 7 are separated by a radial distance s. The minimum value of the radial distance s is predetermined. Suitably, radial distance s is at least the length of a pole pair. In other words, s>2y.

Figure 3:
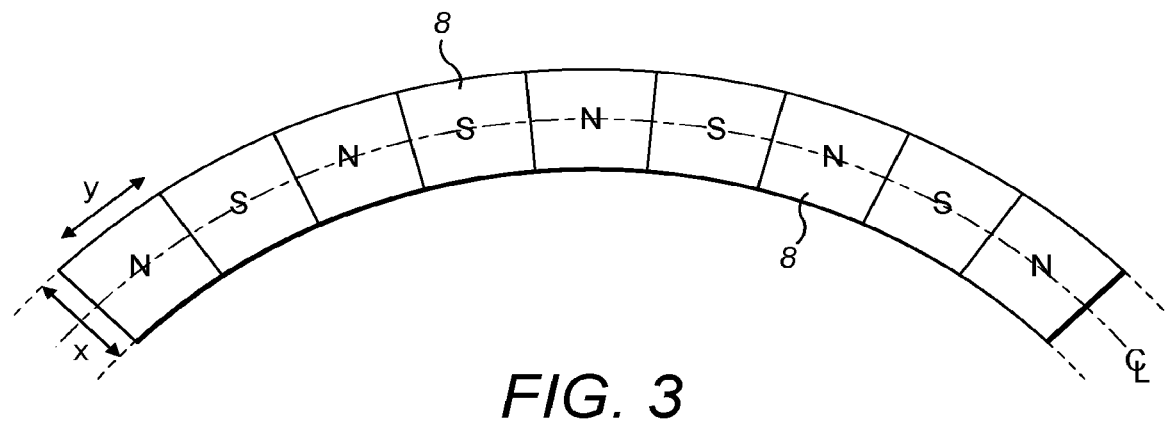
FIG. 3 illustrates a portion of a magnetic ring of FIG. 1.

Each magnetic ring carries a number of permanent magnets defining magnetic poles 8. On the sensing surface of each magnetic ring, the magnets alternate polarity between north and south poles around the ring. Inner magnetic ring 6 has m magnetic pole pairs. Outer magnetic ring 7 has n magnetic pole pairs. Each magnetic pole 8 on the inner magnetic ring 6 is the same shape and size, within manufacturing tolerance. Each magnetic pole 8 on the outer magnetic ring 7 is the same shape and size, within manufacturing tolerance. Suitably, each magnetic pole 8 on the inner magnetic ring 6 is the same shape and size as each magnetic pole 8 on the outer magnetic ring 7, within manufacturing tolerance and the fact that the arc radius of the inner magnetic ring is different to the arc radius of the outer magnetic ring. A portion of a magnetic ring is shown in more detail in FIG. 3. Each magnetic pole 8 has a radial length x and a circumferential length y. In one example, y is 2 mm. In this example, a pole pair (i.e. a north pole and adjacent south pole pair) has a circumferential length of 4 mm.

The magnetic sensor assembly is mounted to the articulated structure so as to detect relative rotation between two elements. The magnetic sensor assembly is rigidly attached to one of those elements, such that the magnetic sensor assembly is not permitted to move relative to that element. The disc 3 is rigidly attached to the other of those elements, such that the magnetic rings 6, 7 are not permitted to move relative to that other element. In the case of the example of FIG. 1, the disc 3 is rigidly attached to the shaft 1. The magnetic sensor assembly is rigidly attached to the part of the articulated structure that the shaft 1 rotates relative to.

The magnetic sensor assembly detects relative rotation of the first and second magnetic rings and the magnetic sensor assembly. Magnetic sensor assembly comprises two magnetic sensor arrays 11, 12. Inner magnetic sensor array 11 is disposed adjacent to and aligned with the inner magnetic ring 6. Outer magnetic sensor array 12 is disposed adjacent to and aligned with the outer magnetic ring 7. Since the magnetic sensor assembly is mounted to the articulated structure relative to which shaft 1 rotates, as shaft 1 rotates, the magnetic rings 6 and 7 revolve past the magnetic sensor arrays 11, 12. Each sensor array is capable of detecting transitions between north and south poles of the magnetic ring it is disposed over as those transitions move past the sensor array. In an exemplary implementation, the first and second magnetic rings 6, 7 are separated radially by at least the length of a pole pair. Increasing the separation of the rings reduces the interference each ring causes to the sensor of the other ring. Thus, separating the rings by at least the length of a pole pair aids the inner magnetic sensor array 11 only detecting the transitions of the inner magnetic ring 6, and the outer magnetic sensor array 12 only detecting the transitions of the outer magnetic ring 7.

Figure 4:
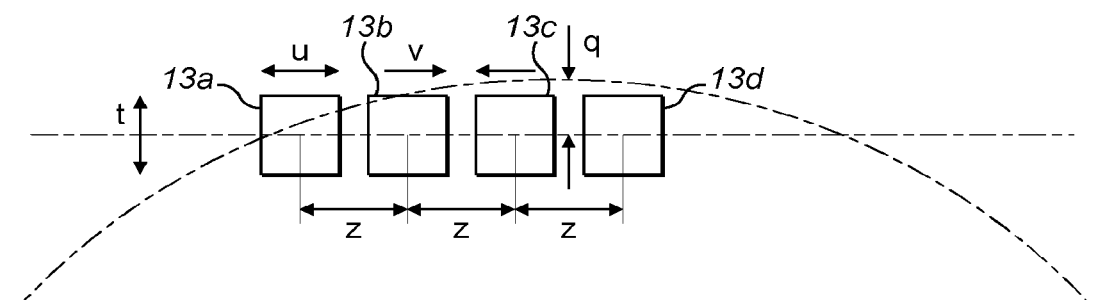
FIG. 4 illustrates a magnetic sensor array of FIG. 1.

Each magnetic sensor array 11, 12 comprises a set of sensors. FIG. 4 illustrates an example in which a magnetic sensor array comprises four individual sensors 13a,b,c,d. Each magnetic sensor array is rectilinear. As can be seen from FIG. 4, the individual sensors are arranged in a straight line. The sensors of the set are all the same size and shape and have equal spacing between them. Each sensor 13 has a width t and a length u and is separated from the next sensor by a distance v. The centers of adjacent sensors are separated by a distance z. In the example shown in FIG. 4 in which the magnetic sensor array has four individual sensors, z is the same as a quarter the length of a pole pair. In other words, z=y/2. Thus, whilst the centers of the sensors marked 1 and 3 are over the boundary between adjacent poles, the centers of sensors marked 2 and 4 are over the centers of adjacent poles. The centers of the outer sensors (marked 1 and 4) are separated by three quarters the length of a pole pair. In an exemplary implementation, t is less than the radial extent of the magnetic ring x. In other words, t<x Since the individual sensors are in a straight line whereas the magnetic ring is circular, the center of each sensor is not consistently aligned with the center of a magnetic pole as the shaft rotates. The offset between the center of the sensor and the center of the magnetic pole varies as the shaft rotates. This variable offset causes a systematic error in the sensor output. In an alternative implementation, the magnetic sensor arrays 11, 12 are each in a circular configuration centered on the center of the disc 3. In this case, the radius of the centreline of each magnetic sensor array is the same as the radius of the centreline of the magnetic ring it is reading. Thus, the centreline of the magnetic sensor array is consistently aligned with the centreline of the magnetic ring it is reading as the shaft rotates The sensors could, for example, be Hall effect sensors, reed sensors, magnetoresistive sensors or inductive sensors.

Each magnetic sensor array 11, 12 is arranged to provide a multi-bit output representing the relative position of the neighboring poles to it. The number and relative placement of the poles on the magnetic rings are arranged such that each position of the shaft within the range of rotation angles to be measured is associated with a unique set of outputs from the two magnetic sensor arrays 11, 12. The number of poles m on the inner ring and the number of poles n on the outer ring are different and co-prime. Their selection is described further below. The outputs from the sensors pass to a processing unit 14.

The circumferential positions of the magnetic sensor arrays 11, 12 and the rotational position of the disc 3 about axis 2 may be chosen so that the transitions between the poles on the inner magnetic ring 6 as sensed by magnetic sensor array 11 occur for different rotational positions of the shaft from the transitions between the poles on the outer magnetic ring 7 as sensed by magnetic sensor array 12. This allows the direction of rotation of the shaft to be inferred from the relative order of the transitions sensed by each magnetic sensor array.

The outputs of magnetic sensor arrays 11, 12 pass to the processing unit 14. The processing unit comprises a processor device 15, which could be hard coded to interpret the signals from the magnetic sensor arrays 11, 12 or could be a general purpose processor configured to execute software code stored in a non-transient way in memory 16. The processor device combines the signals from the sensors to form an integrated output signal at 17.

A method of selecting the number of magnetic pole pairs m on the inner magnetic ring 6 and the number of magnetic pole pairs n on the outer magnetic ring 7 will now be described.

The selection of m and n may be subject to any one, any combination, or all of the following constraints:

1. The inner and outer magnetic rings 6, 7 both need to fit on the disc 3. Suitably, the inner and outer magnetic sensor arrays 11, 12 are each disposed within the footprint of the disc 3 as well. The inner radial boundary 5 is at a radius n. In order to fit the inner magnetic sensor array 11 over the disc 3 without exceeding the inner radial boundary 5, the centreline 9 of the inner magnetic ring is separated from the inner radial boundary 5 by at least the portion of the radial width of the magnetic sensor assembly 11 which is disposed between the centreline 9 of the inner magnetic ring and the inner radial boundary 5. This portion may be half the radial width of the magnetic sensor assembly, i.e. Wm/2. In other words, $r_m > n + w_m/2$. If the sensor array is offset radially within the sensor assembly, then the portion may be greater. In one example, $r_m > n + (w_m+1)/2$. The outer radial boundary 4 is at a radius $r_0$. In order to fit the outer magnetic sensor array 12 over the disc 3 without exceeding the outer radial boundary 4, the centreline 10 of the outer magnetic ring is separated from the outer radial boundary 4 by at least the portion of the radial width of the magnetic sensor assembly 12 which is disposed between the centreline 10 of the outer magnetic ring and the outer radial boundary 4. This portion may be the radial width of the magnetic sensor assembly, i.e. $w_n/2$. In other words, $r_n < r_0 - w_n/2$. If the sensor array is offset radially within the sensor assembly, then the portion may be greater. In one example, $r_n < r_0 - (w_n+1)/2$.

2. The centers of adjacent sensors are separated by a quarter the length of a pole pair. In other words, adjacent sensors are separated by y/2. This ensures that the magnetic sensor array can detect each pole transition as the disc rotates.

3. The radial distance s between the centreline of the inner magnetic ring 6 and the centreline of the outer magnetic ring 7 is greater than a predetermined distance. That predetermined distance is set by a desired insensitivity to stray magnetic fields. Suitably, s>2y. In this case, the nearest magnetic pole on the inner magnetic ring 6 that the inner magnetic sensor array 11 is detecting is always closer than a magnetic pole on the outer magnetic ring 7. Similarly, the nearest magnetic pole on the outer magnetic ring 7 that the outer magnetic sensor array 12 is detecting is always closer than a magnetic pole on the inner magnetic ring 6. Thus, this prevents interference arising from the magnetic sensor array over one magnetic ring detecting a magnetic field from the other magnetic ring.

4. The minimum number of sensors b in each magnetic sensor array is greater than a threshold. This threshold is such that there is sufficient spatial sampling for an unambiguous position reading. Suitably, b>4. Four sensors is sufficient where there are no magnetic harmonics detected.

5. The width, t, of each magnetic sensor is less than the radial extent of the magnetic ring x. In other words, t<x. The signal to noise ratio of the detected transitions is reduced if the magnetic sensor array is narrower than the magnetic ring.

6. The inner radial boundary of the disc may be constrained by the articulated structure. For example, in FIG. 1, the inner radial boundary of the disc is limited by the shaft 1. In this case, the radius of the inner radial boundary n has to be at least as big as the radius of the shaft 1.

7. The outer radial boundary of the disc may be constrained by the articulated structure. For example, the position sensor may fit inside a housing of the articulated structure. In this case, the radius of the outer radial boundary $r_0$ has to be at least as small as the radius of the housing.

8. The position sensor is arranged to detect a maximum angle of rotation. This maximum angle of rotation depends on the element whose rotation is being detected. For a revolute joint, the maximum angle of rotation to be detected depends on the location of that joint in the kinematic chain. The maximum angle of rotation to be detected may be less than 360°. The maximum angle of rotation to be detected may be greater than 360°. The accuracy of the position measurement is proportional to the angle of rotation to be detected. The greater the angle of rotation to be detected, the higher the accuracy of the position measurement needed. The sensor reading accuracy is given by:

$$\text{Accuracy} = \pm 2y \times_2 * V\Sigma \text{pole pairs} \quad \text{(equation 1)}$$

$\Sigma$ pole pairs is the sum of the number of pole pairs of all of the magnetic rings on the disc. When there are two magnetic rings on the disc, $\Sigma$ pole pairs=m+n. The more pole pairs on the magnetic rings, the larger the magnetic rings. Thus, larger magnetic rings lead to more accurate position measurements. The greater the angle of rotation to be detected, the bigger m and/or n are to achieve the required accuracy. Thus, the number of pole pairs on the magnetic rings for detecting rotation of one element relative to another is constrained by the relative angle of rotation to be detected between the two elements. In the case of a revolute joint, the selection of m and n are specific to the maximum angle of rotation of that revolute joint to be detected.

Figure 5:
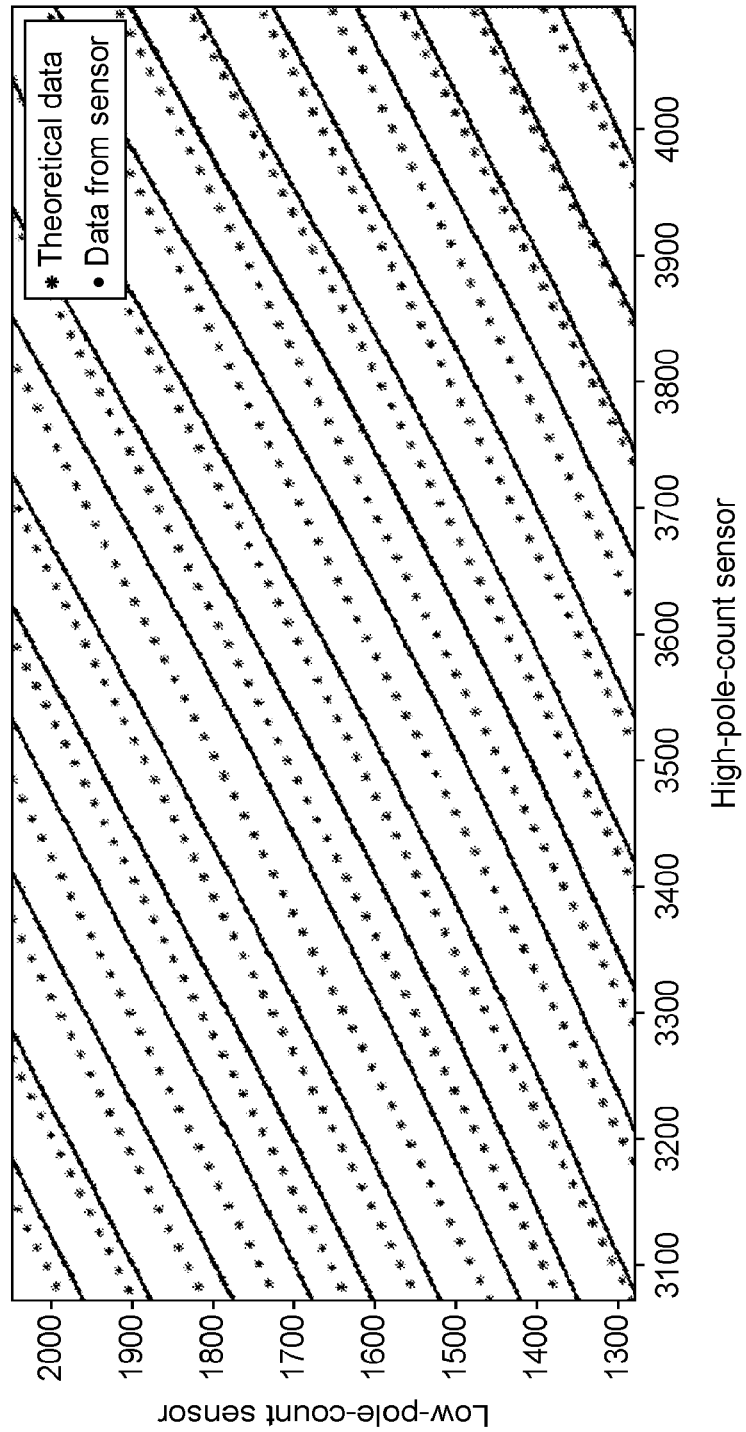
FIG. 5 is a graph illustrating theoretical and actual position sensor readings.

FIG. 5 is a graph which illustrates theoretical and actual position sensor measurements taken from a position sensing arrangement of the form shown in FIG. 1. The x-axis is the position sensor measurement of the outer magnetic sensor array 12, and the y-axis is the position sensor measurement of the inner magnetic sensor array 11. The starred line plot illustrates theoretical measurements with 100% accuracy. The solid line plot illustrates example actual readings. These example actual readings differ from the theoretical readings due to manufacturing variation in the magnetization of the magnetic rings on the disc, manufacturing variation in the magnetic sensor arrays, and/or misalignment between the magnetic rings and the magnetic sensor arrays. In FIG. 5 the actual readings have a consistent offset from the theoretical readings which demonstrates a systematic error in the actual readings.

This offset may be due to an error when magnetizing the disc. For example, the center of the magnetic rings may be offset slightly from the center of rotation of the disc. FIG. 5 also demonstrates additional error in the readings beyond the systematic error. In order to accurately detect which sensor reading was intended, the solid line of the actual readings in the plot of FIG. 5 needs to be closer to the correct line of theoretical readings than another line of theoretical readings.

Figure 6:
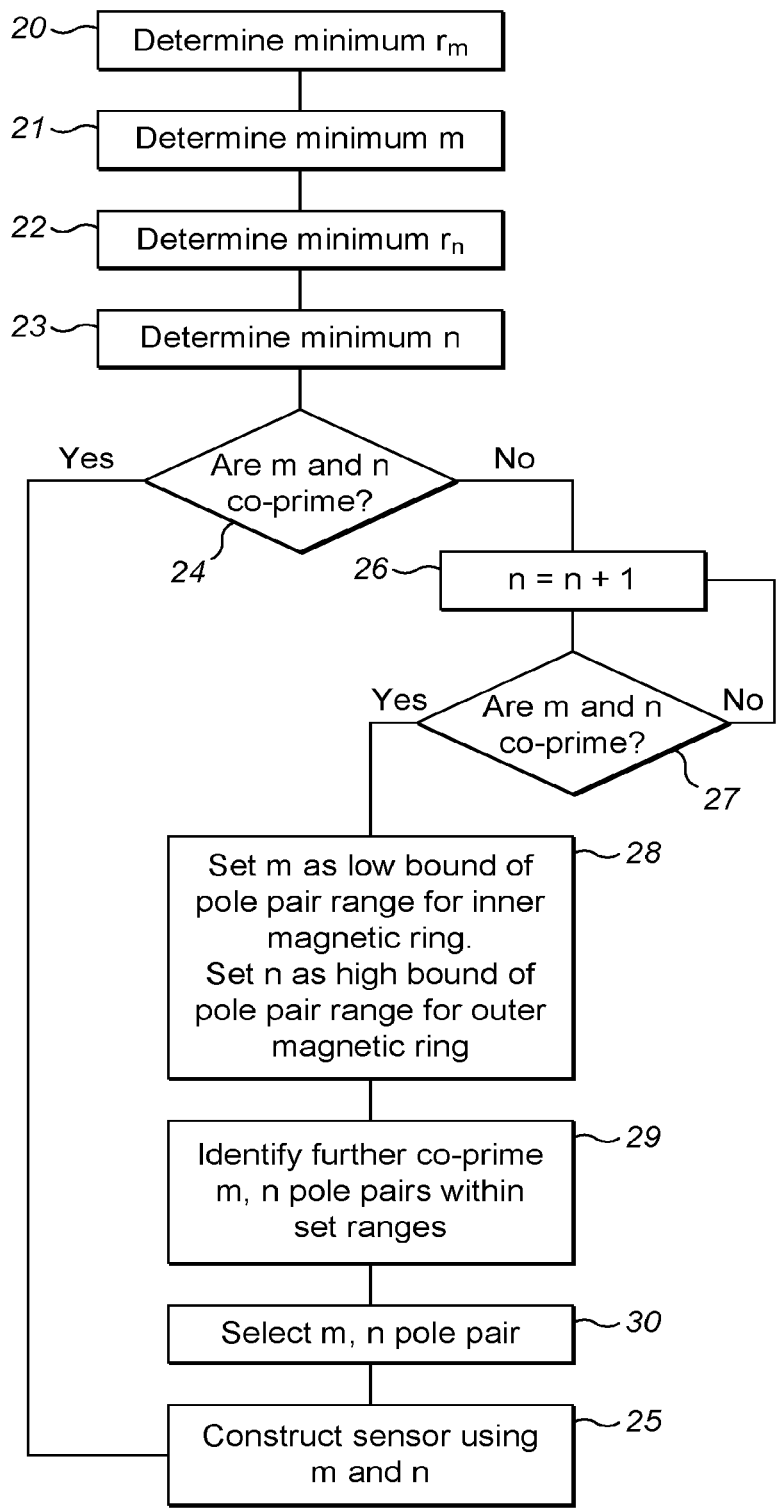
FIG. 6 is a flowchart illustrating a method of determining pole pair numbers for two magnetic rings when the inner radial boundary is limiting.

A method of determining the values of m and n will now be described for an example in which the inner radial boundary of the disc 3 is limiting. For example, the disc may be mounted on a shaft, and hence the radius of the inner radial boundary n of the disc 3 has to be greater than the radius of the shaft. FIG. 6 illustrates the steps of this method.

At step 20, the minimum $r_m$,min is determined. This is the minimum radius of the centreline 9 of the inner magnetic ring permitted by the limiting inner radius n. As described in constraint 1 above, at its minimum, the centreline 9 of the inner magnetic ring is separated from the inner radial boundary 5 by the portion of the radial width of the magnetic sensor assembly 11 which is disposed between the centreline 9 of the inner magnetic ring and the inner radial boundary 5. This is to ensure that the magnetic sensor assembly 11 is confined within the inner radial boundary. In one example, the minimum $r_m$-min is given by:

$$r_m,\min \Pi + (Wm+t)/2 \quad \text{(equation 2)}$$

At step 21, the minimum number of pole pairs m for the inner magnetic ring is determined. The magnetic ring has a whole number of pole pairs. Thus, m is an integer. $r_m$,min is increased to the lowest value of $r_m$, where $$2\pi r_m = \text{raly} \quad \text{(equation 3)}$$

where m is an integer.

At step 22, the minimum $r_n$,min is determined. This is the minimum radius of the centreline 10 of the outer magnetic ring permitted by the limiting inner radius n. As described in constraint 3 above, at its minimum, the centreline 10 of the outer magnetic ring is separated radially from the centreline 9 of the inner magnetic ring by a predetermined distance. This predetermined distance is suitably large enough to reduce or minimise interference in the sensor reading of one magnetic ring as a result of the other magnetic ring.

$$r_n,\min = r_n + s \quad \text{(equation 4)}$$

where $r_m$ is that from equation 3, and s is the predetermined distance.

At step 23, the minimum number of pole pairs n for the outer magnetic ring is determined. The magnetic ring has a whole number of pole pairs. Thus, n is an integer. $r_n$,min is increased to the lowest value of $r_n$, where $$2\pi r_n = n2y \quad \text{(equation 5)}$$

where n is an integer.

At step 24, it is determined whether the values of m and n determined at steps 21 and 23 are co-prime. If m and n are co-prime, then these are the m,n pair which provide the most compact disc. In this case, m is chosen to be the number of pole pairs on the inner magnetic ring, and n is chosen to be the number of pole pairs on the outer magnetic ring. The method proceeds to step 25 where the position sensing arrangement is constructed by mounting a disc having an inner magnetic ring with m pole pairs and an outer magnetic ring with n pole pairs to the articulated structure. The disc is rigidly attached to the element of the articulated structure whose position it is configured to sense. The disc is mounted such that it rotates about the same axis as the element whose position it is configured to sense.

If, at step 24, it is determined that the values of m and n determined at steps 21 and 23 are not co-prime, then the method proceeds to step 26. At step 26, the value of n determined at step 23 is incremented by 1. At step 27, it is determined whether the new value of n determined at step 26 and the value of m determined at step 21 are co-prime. If they are not co-prime, then the method returns to step 26, where the value of n is incremented by 1. Then the method returns to step 27 where it is determined whether the new value of n is co-prime with m. Steps 26 and 27 continue iteratively, each iteration incrementing the value of n by 1, until a value of n is reached which is co-prime with m. Each iteration thereby increments the difference between m and n by 1.

Once a value of n is found which is co-prime with m, the method proceeds to step 28. At step 28, the value of m determined at step 21 is set as the lower bound of a range of number of pole pairs of the inner magnetic ring 6. Also at step 28, the value of n which was determined to be co-prime with m at step 27 is set as the upper bound of a range of number of pole pairs of the outer magnetic ring 7.

At step 29, further co-prime m,n pairs are identified which lie within the ranges set by step 28. In other words, further values of m and n are identified which are co-prime and for which m is greater than the lower bound set in step 28 and n is smaller than the upper bound set in step 28. These co-prime m,n pairs also satisfy any other constraints, such as being such that the outer magnetic ring is separated from the inner magnetic ring by at least the predetermined minimum value of the distance s.

In an illustrative example, the m and n values initially determined at steps 21 and 23 are m=30 and n=35. These are not co-prime. Iterating n at step 26 results in an m,n pair of m=30 and n=37. At step 29 the following further co-prime pairs are identified: m=31, n=36: m=31, n=37; m=32, n=37.

At step 30, one of the co-prime m,n pairs is selected. This m,n pair may be either the value of m determined in step 21 and the value of n determined to be co-prime with that value of m in step 27, or alternatively, the m,n pair may have been determined at step 29. The m,n pair selected depends on the implementation.

In one example, the co-prime m,n pair having the largest value of m is selected at step 30. In the example provided above, m=32, n=37 would be selected. Selecting the m,n pair with the largest value of m maximizes the accuracy of the resulting sensor, as can be seen from equation 1.

In another example, the co-prime m,n pair having the smallest value of n is selected at step 30. In the example provided above, m=31, n=36 would be selected. Selecting the m,n pair with the smallest value of n minimizes the outer radius of the disc $r_0$, thus minimizes the overall space taken up by the sensor.

In another example, the co-prime m,n pair having the smallest value of n-m is selected at step 30. Selecting the m,n pair with the smallest value of n-m minimizes the radial width of the disc, thus provides the most compact sensor. In the example provided above, two m,n pairs have the smallest value of n-m: m=31, n=36; and m=32, n=37.

The m,n pair selected at step 30 may be chosen in dependence on the maximum angle of rotation to be sensed. As described above, the maximum angle of rotation specifies a required minimum accuracy, which in turn specifies a required minimum sum of the number of pole pairs on the magnetic rings. This is a competing constraint to providing a compact sensor. To balance these competing requirements, the smallest co-prime m,n pair whose sum exceeds the required minimum sum of the number of pole pairs on the magnetic rings may be selected at step 30.

Any one or combination of these criteria may be applied in a specific implementation. For example, the co-prime m,n pair having the smallest value of n-m may be selected. In the event that there is more than one co-prime m,n pair having the smallest value of n-m, the one of those which has the largest m may be selected. Thus, in the example above, m=32, n=37 would be chosen.

Once the co-prime m,n pair are selected at step 30, m of the selected m,n pair is chosen to be the number of pole pairs on the inner magnetic ring, and n of the selected m,n pair is chosen to be the number of pole pairs on the outer magnetic ring. The method then proceeds to step 25, where the position sensing arrangement is assembled by mounting a disc having an inner magnetic ring with m pole pairs and an outer magnetic ring with n pole pairs to the articulated structure as previously described.

Figure 7:
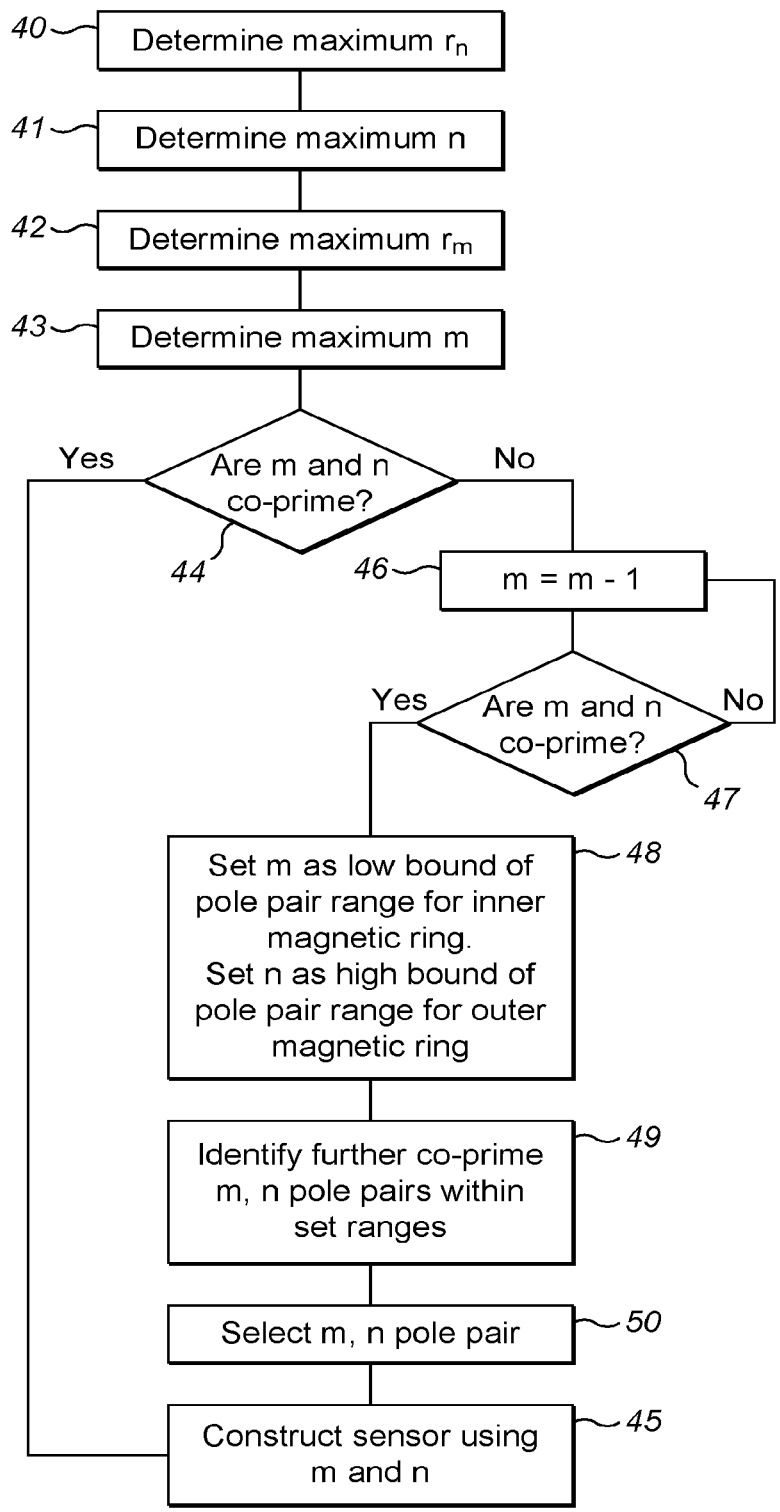
FIG. 7 is a flowchart illustrating a method of determining pole pair numbers for two magnetic rings when the outer radial boundary is limiting.

A method of determining the values of m and n will now be described for an example in which the outer radial boundary of the disc 3 is limiting. For example, the disc may be mounted within a housing, and hence the radius of the outer radial boundary $r_0$ of the disc 3 has to be less than the closest distance of the housing to the center point of the disc. FIG. 7 illustrates the steps of this method.

At step 40, the maximum $r_n$,max is determined. This is the maximum radius of the centreline 10 of the outer magnetic ring permitted by the limiting outer radius $r_0$. As described in constraint 1 above, at its maximum, the centreline 10 of the outer magnetic ring is separated from the outer radial boundary 4 by the portion of the radial width of the magnetic sensor assembly 12 which is disposed between the centreline 10 of the outer magnetic ring and the outer radial boundary 4. This is to ensure that the magnetic sensor assembly 12 is confined within the outer radial boundary. In one example, the maximum $r_n$-max is given by:

$$r_n\text{,max} = r_0 - (w_n + 1)/2 \qquad \text{(equation 6)}$$

At step 41, the maximum number of pole pairs n for the outer magnetic ring is determined. The magnetic ring has a whole number of pole pairs. Thus, n is an integer. $r_n$,max is decreased to the highest value of $r_n$, where $$2\pi r_n = n2y \qquad \text{(equation 7)}$$

where n is an integer.

At step 42, the maximum $r_m$,max is determined. This is the maximum radius of the centreline 9 of the inner magnetic ring permitted by the limiting outer radius $r_0$. As described in constraint 3 above, at its minimum, the centreline 9 of the inner magnetic ring is separated radially from the centreline 10 of the outer magnetic ring by a predetermined distance. This predetermined distance is suitably large enough to reduce or minimise interference in the sensor reading of one magnetic ring as a result of the other magnetic ring.

$$r_m\text{,max} = r_n - s \qquad \text{(equation 8)}$$

where $r_n$ is that from equation 7, and s is the predetermined distance.

At step 43, the maximum number of pole pairs m for the inner magnetic ring is determined. The magnetic ring has a whole number of pole pairs. Thus, m is an integer. $r_m$,max is decreased to the largest value of $r_m$, where $$2\pi r_m = \text{raly} \qquad \text{(equation 9)}$$

where m is an integer.

At step 44, it is determined whether the values of m and n determined at steps 41 and 43 are co-prime. If m and n are co-prime, then these are the m,n pair which provide the most compact disc. In this case, m is chosen to be the number of pole pairs on the inner magnetic ring, and n is chosen to be the number of pole pairs on the outer magnetic ring. The method proceeds to step 45 where the position sensing arrangement is constructed by mounting a disc having an inner magnetic ring with m pole pairs and an outer magnetic ring with n pole pairs to the articulated structure. The disc is rigidly attached to the element of the articulated structure whose position it is configured to sense. The disc is mounted such that it rotates about the same axis as the element whose position it is configured to sense.

If, at step 44, it is determined that the values of m and n determined at steps 41 and 43 are not co-prime, then the method proceeds to step 46. At step 46, the value of m determined at step 43 is decremented by 1. At step 47, it is determined whether the new value of m determined at step 46 and the value of n determined at step 41 are co-prime. If they are not co-prime, then the method returns to step 46, where the value of m is decremented by 1. Then the method returns to step 47 where it is determined whether the new value of m is co-prime with n. Steps 46 and 47 continue iteratively, each iteration decrementing the value of m by 1, until a value of m is reached which is co-prime with n. Each iteration thereby increments the difference between m and n by 1.

Once a value of m is found which is co-prime with n, the method proceeds to step 48. At step 48, the value of n determined at step 41 is set as the upper bound of a range of number of pole pairs of the outer magnetic ring 7. Also at step 48, the value of m which was determined to be co-prime with n at step 47 is set as the lower bound of a range of number of pole pairs of the inner magnetic ring 6.

At step 49, further co-prime m,n pairs are identified which lie within the ranges set by step 48. In other words, further values of m and n are identified which are co-prime and for which m is greater than the lower bound set in step 48 and n is smaller than the upper bound set in step 48. These co-prime m,n pairs also satisfy any other constraints, such as being such that the outer magnetic ring is separated from the inner magnetic ring by at least the predetermined distance.

At step 50, one of the co-prime m,n pairs is selected. This m,n pair may be either the value of n determined in step 41 and the value of m determined to be co-prime with that value of m in step 47, or alternatively, the m,n pair may have been determined at step 49. The m,n pair selected depends on the implementation.

In one example, the co-prime m,n pair having the largest value of m is selected at step 40. Selecting the m,n pair with the largest value of m maximizes the accuracy of the resulting sensor, which can be seen from equation 1.

In another example, the co-prime m,n pair having the smallest value of n-m is selected at step 50. Selecting the m,n pair with the smallest value of n-m minimizes the radial width of the disc, thus provides the most compact sensor.

The m,n pair selected at step 50 may be chosen in dependence on the maximum angle of rotation to be sensed. The smallest co-prime m,n pair whose sum exceeds the required minimum sum of the number of pole pairs on the magnetic rings may be selected at step 50.

Any one or combination of these criteria may be applied in a specific implementation. For example, the co-prime m,n pair having the smallest value of n-m may be selected. In the event that there is more than one co-prime m,n pair having the smallest value of n-m, the one of those which has the largest m may be selected.

Once the co-prime m,n pair are selected at step 50, m of the selected m,n pair is chosen to be the number of pole pairs on the inner magnetic ring, and n of the selected m,n pair is chosen to be the number of pole pairs on the outer magnetic ring. The method then proceeds to step 45, where the position sensing arrangement is assembled by mounting a disc having an inner magnetic ring with m pole pairs and an outer magnetic ring with n pole pairs to the articulated structure as previously described.

It will be understood that the flowcharts of FIGS. 6 and 7 represent exemplary methods of determining the number of poles on the inner and outer magnetic rings in cases for which the inner radial boundary or the outer radial boundary of the disc is limiting. Not all of the steps described are necessarily required to determine the number of poles. For example, the minimum number of poles m and n determined at steps 21 and 23 of FIG. 6 could be determined without actually determining the minimum radii $r_m$,min and $r_n$ Similarly, the maximum number of poles m and n determined at steps 41 and 43 of FIG. 7 could be determined without actually determining the maximum radii $r_m$,max and $r_n$,max.

Figure 8:
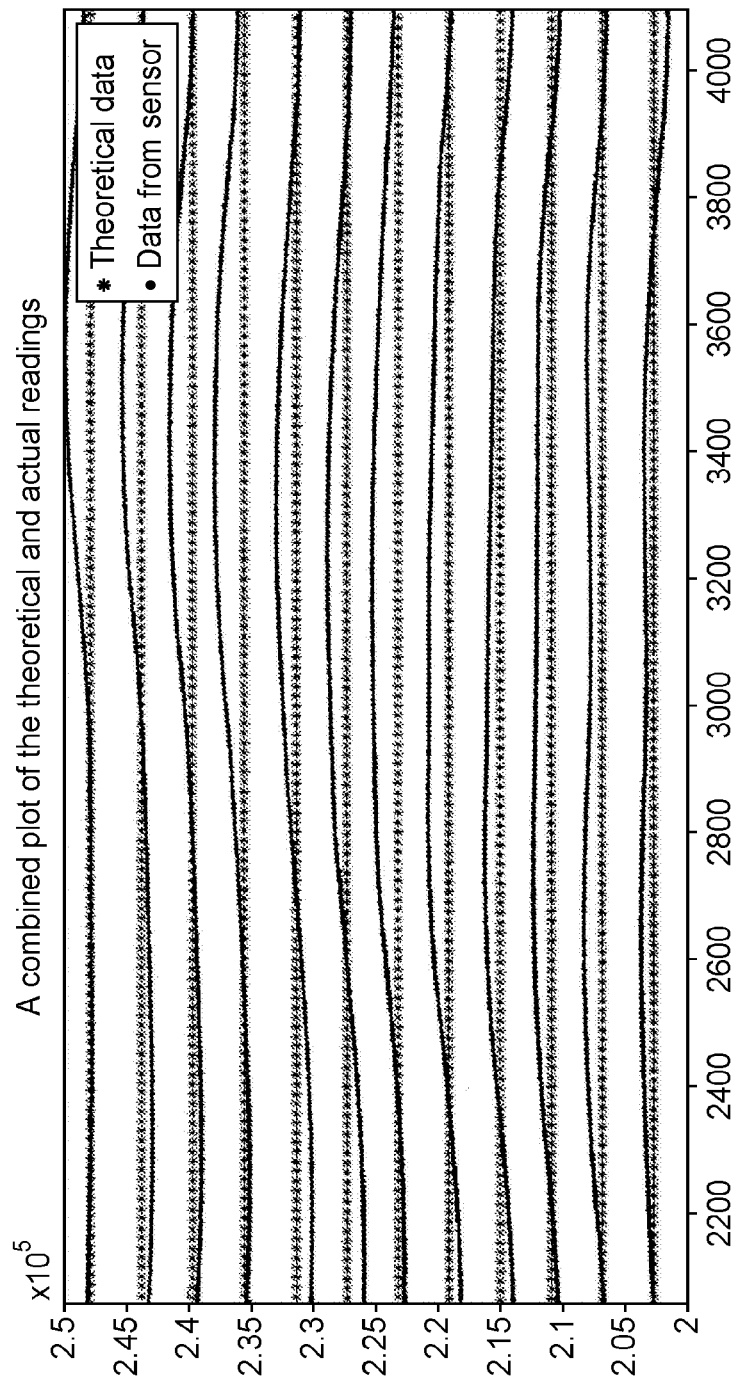
FIG. 8 is a graph illustrating theoretical and actual combined position sensor readings.

The angle of rotation detected by the sensor can be determined from the sensor readings from the inner magnetic ring and the outer magnetic ring as follows. The angle of rotation detected is equal to the number of whole revolutions of the outer magnetic ring plus the current sensor reading for the outer magnetic ring. FIG. 8 is a graph which illustrates theoretical and actual sensor measurements taken from a position sensing arrangement of the form shown in FIG. 1. The x-axis is the position sensor measurement of the outer magnetic sensor array 12. The y-axis is a combined sensor reading which is ((outer sensor array reading×n)−(inner sensor array reading×m)). The starred line plot illustrates theoretical measurement with 100% accuracy. The solid line plot illustrates example actual readings. The starred line plot is a series of straight lines. Each straight line represents a specific number of revolutions of the outer magnetic ring and a specific number of revolutions of the inner magnetic ring. Thus, one method of determining the angle of rotation detected by the sensor is to determine:

$$X = (\text{outer sensor array reading} \times n) - (\text{inner sensor array reading} \times m) \quad \text{(equation 10)}$$

And compare X to a look up table which maps X to a number of revolutions of the outer ring. The angle of rotation is then:

$$\text{Angle of rotation} = \text{no. of revolutions of outer ring} + \text{current outer sensor array reading} \quad \text{(equation 11)}$$

The angle of rotation could alternatively be determined in a similar manner with respect to the inner sensor array readings.

Figure 2:
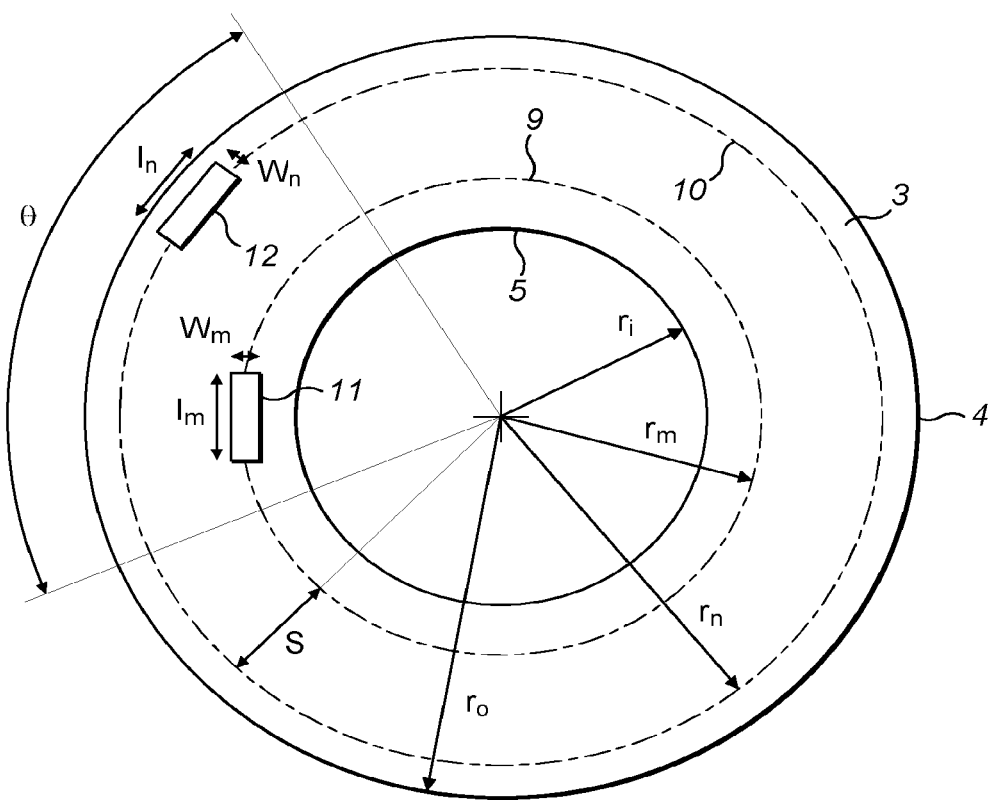
FIG. 2 illustrates the dimensions of a disc 3 of FIG. 1.

In the example shown in FIGS. 1 and 2, both magnetic rings 6 and 7 are disposed on the same surface of disc 3. However, magnetic rings 6 and 7 may be disposed on opposing surfaces of disc 3. In this case, the magnetic sensor arrays are mounted over opposing surfaces of the disc 3. The inner magnetic sensor array is mounted over the inner magnetic ring so as to detect transitions of poles on that inner magnetic ring. The outer magnetic sensor array is mounted over the outer magnetic sensor array so as to detect transitions of poles on that outer magnetic ring. In this case, the minimum radial spacing s between the centerlines 9 and 10 of the inner and outer magnetic rings is less than if the magnetic rings are on the same surface of the disc. This is because the interference caused to a magnetic sensor array by a magnetic ring whose poles are exposed on the opposing surface of the disc to the magnetic sensor array is less than the interference caused by a magnetic ring the same distance away on the same side of the disc as the magnetic sensor array. Thus the radial distance between the centerlines of the inner and outer magnetic rings may be less than the length of a pole pair $2y$.

In the example shown in FIGS. 1 and 2, the inner and outer magnetic rings 6, 7 are on the same disc 3. Alternatively, the inner magnetic ring and the outer magnetic ring may be disposed on different discs. Those different discs have the same axis of rotation, which is the same as the element whose rotation is to be detected. However, those different discs are separated along the axis of rotation. For example, when measuring the rotation of a revolute joint, the discs may be mounted on opposing sides of the joint. This may be desirable for packing/compactness reasons. In this example, the number of pole pairs m and n on the inner and outer magnetic rings would be determined as described herein. However, since the inner and outer magnetic rings are axially separated, the interference caused by one magnetic ring to the sensing of the other magnetic ring is negligible, and hence there is no constraint for the magnetic rings to be separated radially.

The apparatus and methods described herein can be used to detect less than a full revolution of one element relative to another. The apparatus and methods described herein can also be used to detect greater than one full revolution of one element with respect to another.

In an example implementation, a motor drives a gearbox which drives an element of the articulated structure. One magnetic ring is rigidly attached to the motorshaft output from the motor. The other magnetic ring is rigidly attached to the driveshaft output from the gearbox. Thus, the two magnetic rings are axially separated. The axis of rotation of the motorshaft and the driveshaft are the same. Both magnetic rings are centered on this axis of rotation. Suitably, the inner magnetic ring having m poles is attached to the motorshaft, and the outer magnetic ring having n poles is attached to the driveshaft. $n>m$. If a fractional gear ratio is used, then more than one revolution of the driveshaft can be distinguished. For example, with a gear ratio of 13:4, up to four revolutions of the driveshaft can be distinguished. This is useful in a robot implementation because it enables the position of the driveshaft to be determined during setup without having to fully rotate the driveshaft one direction and then the other.

In an arrangement in which m is less than a threshold, the magnetic sensor array 11 for the inner magnetic ring is implemented as an on-axis circular array rather than a linear array. The threshold is the maximum number of poles m for which the linear magnetic sensor array does not intersect the arc of the centreline of the inner magnetic ring sufficiently to provide a useable reading.

In one implementation, $m=I$. In this case, there is just one pole pair on the inner magnetic ring. This pole pair is centered on the center of the disc 3. This pole pair is on the rotation axis of the disc. This pole pair is not aligned with any of the pole pairs on the outer magnetic ring. This enables the direction of rotation to be detected. Using $m=I$ enables a very compact sensor to be used, however it does have low accuracy (see equation 1).

As described above, the m,n pair selected are co-prime. In all cases $n-m>1$. In the case that the inner and outer magnetic rings 6, 7 are on the same surface of disc 3, $n-m>7$. This is because the radial distance s between the centerlines of the inner and outer magnetic rings is greater than or the same as the length of a pole pair to avoid interference. The number of pole pairs on each magnetic ring is an integer. Thus, the minimum difference between the number of pole pairs on the two magnetic rings is the first integer greater than $2\pi$, which is 7. In one example, $n-m>8$. For example, $n=41$, $m=33$. In another example, $n-m>10$. For example, $n=47$, $m=37$.

The apparatus and methods described above relate to sensing the rotation of two magnetic rings 6, 7. The same methods can be adapted to sensing the rotation of three or more magnetic rings. All the magnetic rings are co-axial. They may all be disposed on the same disc or several discs separated axially along their rotation axis. Equation 1 shows that the accuracy of the position sensed increases as the sum of the pole pairs on the magnetic rings increases. Thus by utilizing further magnetic rings, a more accurate position is measured. The number of pole pairs on each magnetic ring is co-prime with the number of pole pairs on all the other magnetic rings. Thus, in the case that there are three magnetic rings, having m, n and h pole pairs, m, n and h are all co-prime. Each magnetic ring is suitably radially separated from adjacent magnetic rings by at least the predetermined distance. Where the magnetic rings are all on the same surface of a disc, each magnetic ring is preferably separated from adjacent magnetic rings by at least the length of a pole pair $2y$.

In the case of FIG. 6, for a position sensor having more than two magnetic rings, a minimum m and a minimum n would be determined as laid out in steps 21 and 23. If there is a third magnetic ring, then a minimum h would be determined in the same manner as n was determined through steps 22 and 23 but this time the minimum radial separation is between the ring with n pole pairs and the ring with h pole pairs. Similarly, if there are further magnetic rings, steps 22 and 23 are repeated for each further magnetic ring in a corresponding manner. Only if all the pole pair numbers are co-prime at step 24, does the method proceed to step 25. Otherwise, method steps 26 and 27 are performed for each further ring until a set of co-prime pole pair numbers for each ring is determined. The pole pair number of the smallest magnetic ring is set as the low bound for that magnetic ring at step 28. The pole pair number for the largest magnetic ring is set as the high bound for that magnetic ring at step 28. Further co-prime pole pair numbers are determined for all the magnetic rings at step 29, ensuring that the separation between the adjacent rings is at least the minimum radial separation. A pole pair combination is selected at step 30 in accordance with the above-described methods. The position sensing arrangement is constructed by mounting a disc to the articulated structure which has a group of magnetic rings with the numbers of pole pairs on each ring selected at step 30.

In the case of FIG. 7, for a position sensor having more than two magnetic rings, a maximum n and a maximum m would be determined as laid out in steps 41 and 43. If there is a third magnetic ring, then a maximum h would be determined in the same manner as m was determined through steps 42 and 43 but this time the minimum radial separation is between the ring with m pole pairs and the ring with h pole pairs. Similarly, if there are further magnetic rings, steps 42 and 43 are repeated for each further magnetic ring in a corresponding manner. Only if all the pole pair numbers are co-prime at step 44, does the method proceed to step 45. Otherwise, method steps 46 and 47 are performed for each further ring until a set of co-prime pole pair numbers for each ring is determined. The pole pair number of the smallest magnetic ring is set as the low bound for that magnetic ring at step 48. The pole pair number for the largest magnetic ring is set as the high bound for that magnetic ring at step 48. Further co-prime pole pair numbers are determined for all the magnetic rings at step 49, ensuring that the separation between the adjacent rings is at least the minimum radial separation s. A pole pair combination is selected at step 50 in accordance with the above-described methods. The position sensing arrangement is assembled by mounting a disc to the articulated structure which has a group of magnetic rings with the numbers of pole pairs on each ring selected at step 50.

The position sensor described herein is capable of absolute determination of the relative rotational position of two objects. In other words, the position can be determined directly from the output of the sensors without, for example, the need to count up the motion since the relative rotational position was in a reference configuration.

The apparatus and methods described with reference to FIGS. 1 and 2 relate to measuring the relative rotation of two elements. However, the same principles apply to measuring relative linear motion of two elements. In this case, rather than the magnetic array being arranged as rings of magnetic pole pairs, they are arranged as linear tracks of magnetic pole pairs. Two or more linear tracks are used. The tracks have co-prime numbers of magnetic pole pairs. Each track lies parallel to the linear motion of the element whose position is being sensed. A respective linear magnetic sensor array is mounted over each magnetic track, such that as the element moves, the linear magnetic sensor array detects the pole transitions of that linear magnetic sensor array. For example, for an element which moves linearly within a housing, the magnetic sensor arrays may be mounted to the element, and the magnetic tracks fixed to the housing.

At manufacture, disc 3 is magnetized to cause the magnetic rings 6, 7 to have the layout described above. Magnetization heads are mounted over the disc in the same manner as the magnetic sensor arrays 11, 12 of FIG. 1 to magnetize the disc. A magnetic back plate is positioned on the opposing surface of the disc to the surface that the magnetization heads are mounted over. The disc is rotated, thereby magnetizing each pole pair of the magnetic rings.

The accuracy with which the poles are positioned on the disc is limited by manufacturing errors. Those errors include radial positioning errors and angular spacing errors. Radial positioning errors occur when there is an offset between the center of the magnetic rings and the rotation axis of the disc when it is mounted to the articulated structure. When mounted, the centreline of each magnetic ring will not be at a constant radius from the rotation axis. When used in a position sensor, the radius of the centreline of each magnetic ring from the rotation axis is variable around its circumference, and hence different for different pole pairs of the magnetic ring. Radial positioning errors also occur if there is an offset between the intended and actual radial positions of the magnetization head. In such a case, the magnetic ring induced by the magnetization head has a constant radius from the center of the disc, but not the intended radius. Thus, a whole number of pole pairs does not fit around the circumference of the magnetic ring, which leads to uneven lengths of one or more pole pairs of the magnetic ring.

The pole pairs of each magnetic ring are intended to have a constant circumferential length of 2y. Angular spacing errors occur when the circumferential length of the poles are not even around the magnetic ring. This may occur if the disc was not rotated evenly under the magnetization heads during magnetization. If the poles are not of uniform length, then the sensed position will be inaccurate.

Radial positioning errors and angular spacing errors result in a pole pattern that is irregular and not concentric to the rotation axis. The accuracy of the position measurement required depends on what it is being used for. In the field of robotics, particularly surgical robotics, the position measurements need to be highly accurate. The position measurements of all the joints of the robot arm are used in combination with the known layout of the robot arm to determine the position of the end effector. The position of the end effector needs to be known with high precision in order to control it to perform procedures where fine control is required, such as suturing tissue in a patient. The position measurement may be required to have an accuracy of $\pm 25 \mu in$, where the accuracy is determined by equation 1. As previously discussed, the accuracy required varies with the angle of rotation which needs to be detectable. The greater the angle of rotation which needs to be detectable, the greater the accuracy required.

All of the magnetic rings of the disc 3 are magnetized at the same time on the same magnetization jig. The magnetization jig has as many magnetization heads as there are magnetic rings to be magnetized on the disc. Each magnetization head induces the magnetic pole pair pattern of one magnetic ring. In an exemplary implementation, the difference between the placement of the poles on the two magnetic rings is accurate to within $\pm 2y \times \frac{1}{2}$ pole pairs. By magnetizing all the magnetic rings using the same set up at the same time, any radial positioning error is consistently applied across all the magnetic rings. Similarly, any angular spacing error due to the disc not being rotated at a uniform rate, will be consistently applied across all the magnetic rings. These systematic errors affect the pole pairs of all the magnetic rings equally, and therefore the error introduced to the difference between the placement of the poles on the two magnetic rings will be smaller than the sum of the errors introduced into the two rings individually. Thus, the tolerance required in the magnetization when both rings are magnetized together to achieve the desired accuracy is significantly (almost half) the tolerance required if the rings are magnetized individually. The systematic errors may be detectable in the position measurements and compensated for. For example, referring to FIG. 5, a portion of the error in the actual data of the solid line plot is systematic, which can be seen from the fact that the solid line is consistently offset from the theoretical data line. This offset is likely due to a magnetization error of the type described above. This constant offset can be determined and removed, to produce a more accurate result.

The magnetization heads of the magnetization jig may be positioned on the same radial line from the center of rotation of the disc when it is mounted to the magnetization jig. This ensures that any error introduced by uneven rotation of the disc during magnetization is applied along the same radial line to all the magnetic rings. The magnetic sensor arrays of the position sensing arrangement are positioned on the same radial line from the center of rotation of the disc when it is mounted to the articulated structure. The magnetic sensor arrays are located in the same position and orientation relative to the disc that the magnetization heads are located in during magnetization.

The sensors in the magnetic sensor arrays may be monolythic. By forming the sensors in the same process, any error is consistent amongst the sensors, and hence more easily identified as a systematic error when the sensor readings are being evaluated to generate a position measurement.

The values m, n, h etc. for the number of pole pairs on the magnetic rings of the disc may be chosen to be as large as possible within the other constraints. This increases the accuracy of the subsequent measurements and hence reduces the concentricity and positional errors introduced by the manufacturing process.

Figure 9:
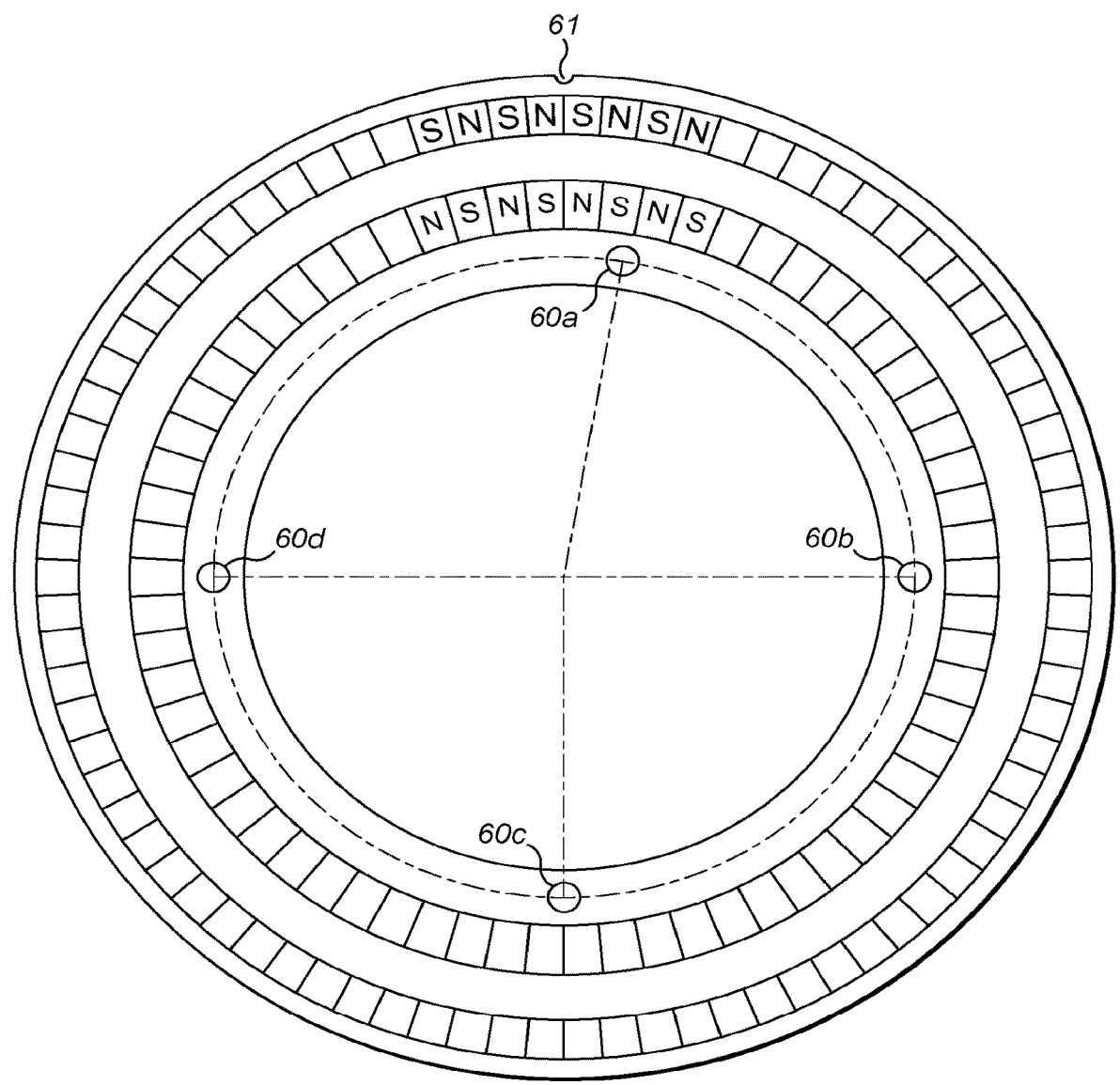
FIG. 9 illustrates arrangements for mounting the disc.

The disc is mounted to the articulated structure in the same configuration that it is mounted to the magnetization jig. In other words, the disc is mounted to the articulated structure in the same position and orientation that it is mounted to the magnetization jig. Suitably, there is only one single orientation in which the disc is mountable to the magnetization jig and articulated structure. The disc comprises a mounting arrangement which aids the user to mount the disc to the articulated structure in the same configuration that it was mounted to the magnetization jig. FIG. 9 illustrates an exemplary mounting arrangement. The mounting arrangement comprises a set of through-holes 60*a*, 60*b*, 60*c*, 60*d*. These through-holes form an asymmetrical pattern on the disc. The through-holes enable the disc to be mounted to complimentary features on the magnetization jig and the articulated structure. Those complimentary features are arranged in the same asymmetrical pattern as the asymmetrical pattern of the through-holes on the disc. For example, the disc may mount to pins which protrude from the magnetization jig/articulated structure in the same arrangement as the pattern of through-holes on the disc. In this example, the disc is secured to the magnetization jig/articulated structure by a retaining mechanism which retains the disc against the magnetization jig/articulated structure. For example, the pins may be threaded pins, and a threaded nut may be threaded onto the threaded pin to retain the disc to the magnetization jig/articulated structure. In another example, the magnetization jig/articulated structure may have threaded recesses in the same asymmetrical pattern as the pattern of through-holes on the disc. The disc may be retained to the magnetization jig/articulated structure by screwing the disc to the magnetization jig/articulated structure through the through-holes into the threaded recesses.

FIG. 9 illustrates through-holes as the mounting features of the mounting arrangement. However, other types of mounting features would be appropriate, as long as complimentary features are provided on the magnetization jig/articulated structure in the same asymmetrical pattern, and as long as the disc can be secured to the magnetization jig/articulated structure by the mounting features and complimentary features. For example, the mounting features on the disc may be pins, and the magnetization jig/articulated structure have complimentary features.

Thus, the use of the offset mounting feature pattern shown in FIG. 9 enables the disc to be mounted to a complimentary magnetization jig/articulated structure in a single orientation only.

FIG. 9 also illustrates a further exemplary mounting arrangement. The mounting arrangement comprises one or more alignment notches 61. When mounted on the magnetization jig or articulated structure, the alignment notch 61 is aligned with a complimentary feature on the magnetization jig/articulated structure. This ensures that the disc is in the same orientation when mounted to both the magnetization jig and the articulated structure. FIG. 9 illustrates an alignment notch, but any type of marking on the disc feature would be suitable, so long as a corresponding marking is provided on the magnetization jig/articulated structure to align the marking of the disc with.

Once the disc has been magnetized during manufacture, the pole positions may be accurately measured and recorded. The length of each pole, or the error of each pole length from the intended length, may be recorded. The radial distance between the axis of rotation of the disc and the poles may be recorded. These measurements may be recorded in processing unit 14. This characterization of the pole positions can be subsequently used when the position sensor is in use in order to compensate for errors introduced during manufacture. By using a mounting arrangement which ensures the disc is mounted to the articulated structure in the same orientation that it was mounted to the magnetization jig, the processing unit is able to map the sensed data from the sensors of the sensor arrays to the recorded characterization data of the magnetic ring, and correct for the known manufacturing errors, thereby resulting in a more accurate position measurement.

Alternatively, or additionally, the position sensing arrangement may be calibrated. The calibration process involves generating a correcting function which is subsequently applied to position readings in order to produce corrected position readings which are more accurate.

Figure 10:
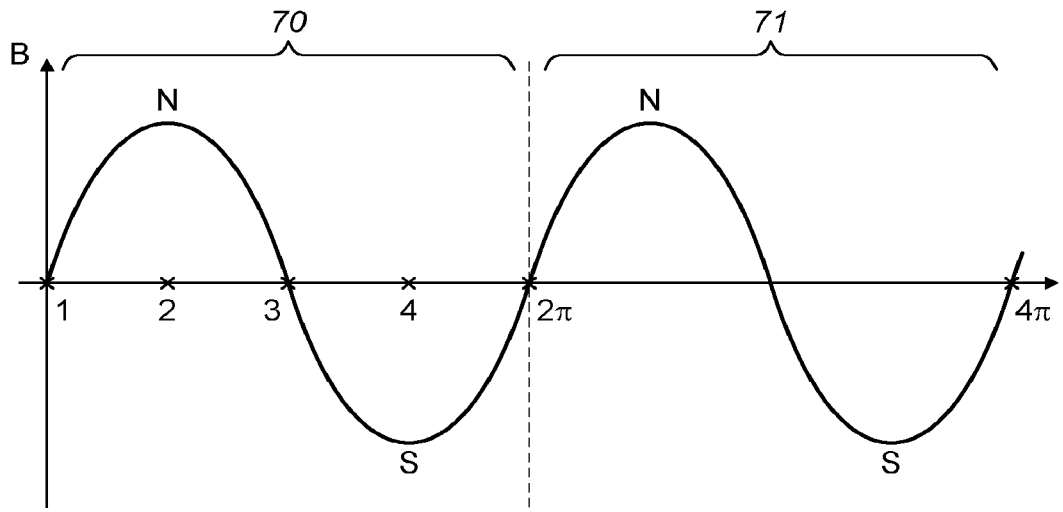
FIG. 10 illustrates the magnetic field detected by a magnetic sensor array.

FIG. 10 illustrates the magnetic field detected by a magnetic sensor array as a magnetic ring revolves relative to it. 70 denotes the portion of the graph showing the magnetic field detected from a first magnetic pole pair, and 71 denotes the portion of the graph showing the magnetic field detected from a second magnetic pole pair. The individual sensors may be located in positions marked 1, 2, 3 and 4 relative to the magnetic pole pairs. In other words, as previously described, the centers of the sensors are separated by a quarter of the length of a pole pair. The centers of the outer sensors (marked 1 and 4) are separated by three quarters the length of a pole pair. Theoretically, the magnetic field varies sinusoidally as a magnetic ring moves past the magnetic sensor array, with one period of the sine wave representing one pole pair. However, imperfections in the manufacturing of the magnetic ring and the alignment of the magnetic sensor assembly with the magnetic ring causes the magnetic field to deviate from a perfect sine wave.

Figure 11:
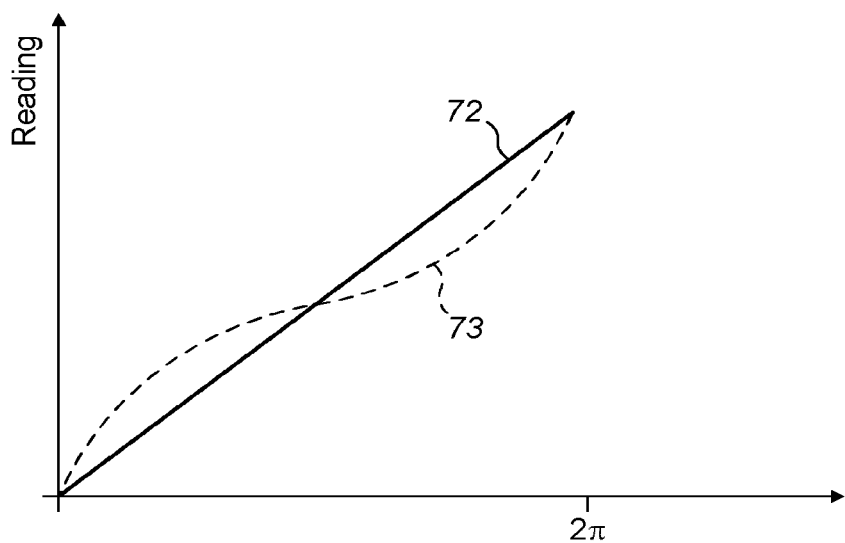
FIG. 11 illustrates theoretical and actual sensor readings taken whilst a single magnetic pole pair passes a magnetic sensor assembly.

FIG. 11 illustrates a theoretical sensor reading taken whilst a single magnetic pole pair passes the magnetic sensor assembly. This theoretical sensor reading is multi-bit and represented by line 72 in FIG. 11. FIG. 11 also illustrates an actual sensor reading taken whilst a single magnetic pole pair passes the magnetic sensor assembly. The actual sensor reading is multi-bit and represented by curve 73 in FIG. 11.

Figure 12:
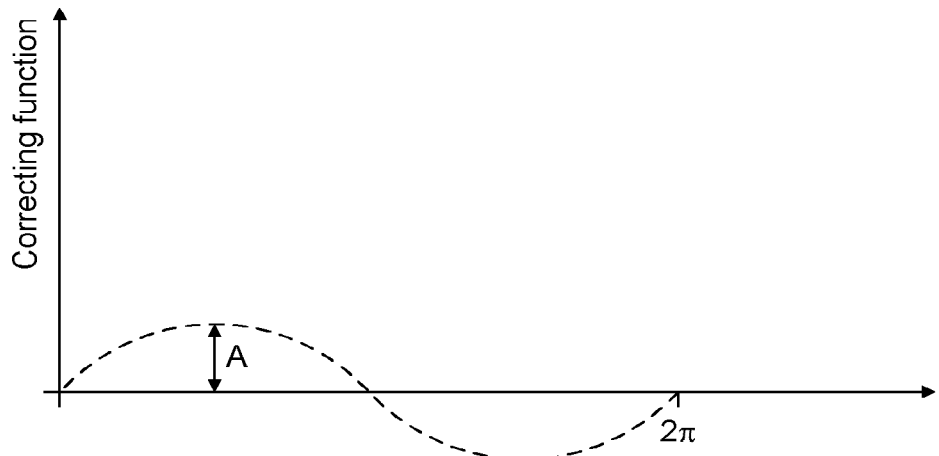
FIG. 12 illustrates a correcting function for a pole pair.

A calibration process will now be described which aims to correct measured sensor position readings for the error shown in FIG. 11. This process is applied to each magnetic ring of the disc individually. Firstly, a position reading 73 is taken by the magnetic sensor array for each pole pair of the magnetic ring. This position reading is referred to below as the calibration pole pair position reading for that pole pair. For each pole pair, the calibration pole pair position reading 73 is compared to a model pole pair position reading 72 in order to generate a pole pair correcting function for that pole pair. As can be seen from FIG. 11, the curve of the calibration pole pair position reading 73 oscillates about the straight line of the model pole pair position reading 72. The curve of the calibration pole pair position reading 73 may oscillate periodically about the straight line of the model pole pair position reading 72. For each pole pair, the pole pair correcting function may be generated by fitting a curve to the calibration pole pair position reading 73, and then deducting the straight line of the model pole pair position reading from the fitted curve. This curve may be fitted using a least squares method. Alternatively, the curve may be fitted using any other method known in the art. The fitted curve may be described by a periodically oscillating function. For example, the fitted curve may be a sinusoidal function. FIG. 12 illustrates a correcting function for a pole pair, which is a sine wave of amplitude A. In other words, A sin θ, where θ is the angle within the pole pair sine wave. Although FIG. 12 only shows the first harmonic, A sin θ, higher harmonics may be included in the correcting function for the pole pair. The pole pair correcting functions of the pole pairs of the magnetic ring are then averaged to generate an average pole pair correcting function for the magnetic ring. If the correcting function of each pole pair is represented by a sine wave, then the average pole pair correcting function is given by:

$$-\Sigma A_m \sin mQ \quad \text{(equation 12)}$$

where m is the number of pole pairs on the magnetic ring.

Suitably, this correcting function is stored in processing unit 14. Subsequently, when the position sensor takes a position measurement, the position measurement is corrected using the average pole pair correcting function. The position measurement comprises a plurality of pole pair position readings. The average pole pair correcting function is deducted from each pole pair position reading of the position measurement, thereby generating a corrected position measurement.

Deducting the average pole pair correcting function from each pole pair position reading of a magnetic ring is less accurate than utilizing the errors of each individual pole pair. However, storing only one average pole pair correcting function per magnetic ring reduces the memory usage required for the correction. Also, deducting the average pole pair correcting function is less algorithmically complex than using individual pole pair errors, and hence reduces the processing power required for the correction.

Figure 13:
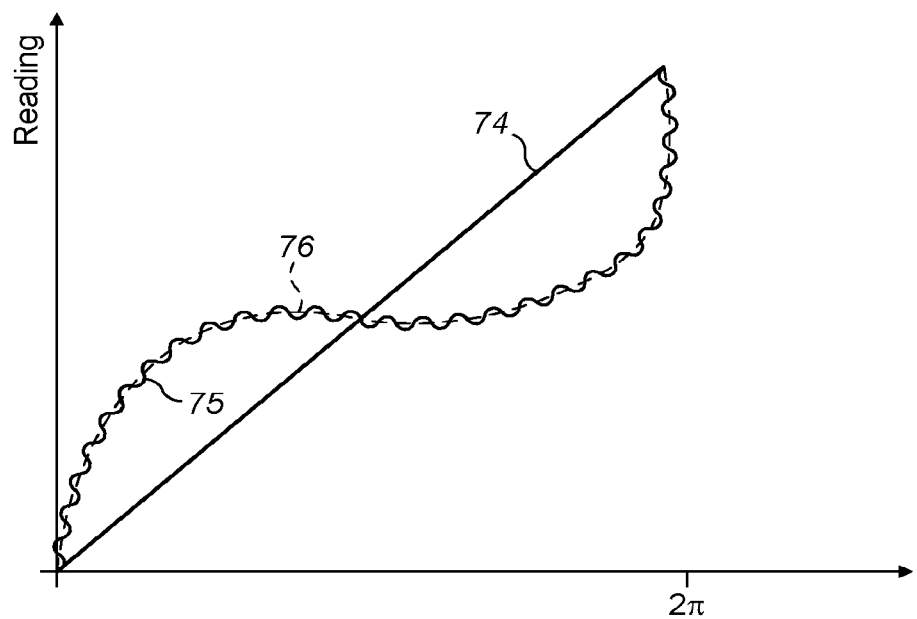
FIG. 13 illustrates theoretical and actual sensor readings taken whilst a whole magnetic ring passes a magnetic sensor assembly.

FIG. 13 illustrates theoretical sensor readings taken whilst a whole magnetic ring passes the magnetic sensor assembly. These theoretical sensor readings are multi-bit and represented by line 74 of FIG. 13. FIG. 13 also illustrates actual sensor readings taken whilst the whole magnetic ring passes the magnetic sensor assembly. These actual sensor readings are multi-bit and represented by curve 75 in FIG. 13. The curve 76 represents the actual sensor readings which have been corrected for the pole pair error as described in relation to FIGS. 10 to 12. FIG. 13 illustrates a further error in the actual sensor readings. This error is approximately a sinewave error compared to the theoretical sensor readings represented by straight line 74.

A calibration process will now be described which aims to correct measured sensor position readings for the further error shown in FIG. 13. This process is applied to each magnetic ring of the disc individually.

Firstly, a position reading 73 is taken by the magnetic sensor array for each pole pair of the magnetic ring. As above, this position reading is referred to as the calibration pole pair position reading for that pole pair. For each pole pair, the calibration pole pair position reading 73 is compared to a model pole pair position reading 72 in order to generate a pole pair correcting function for that pole pair as discussed above. For each pole pair, a corrected calibration pole pair position reading is then generated by deducting the pole pair correcting function from the calibration pole pair position reading for that pole pair. In the example of FIG. 13, curve 76 represents the corrected calibration pole pair position readings of all the pole pairs of the magnetic ring.

A revolution correcting function is then generated by comparing the corrected calibration pole pair position readings for all the pole pairs on the magnetic ring with model revolution position readings. As can be seen from FIG. 13, the curve of the corrected calibration pole pair position readings 76 oscillates about the straight line of the model revolution position readings 74. The curve of the corrected calibration pole pair position readings 76 may oscillate periodically about the straight line of the model revolution position readings 74. The revolution correcting function may be generated by fitting a curve to the corrected calibration pole pair position readings 76, and then deducting the straight line of the model revolution position readings 74 from the fitted curve. This curve may be fitted using a least squares method. Alternatively, the curve may be fitted using any other method known in the art. The fitted curve may be described by a periodically oscillating function. For example, the fitted curve may be a sinusoidal function. The sinusoidal function may be a sine wave of amplitude B, i.e. B sin φ, where φ is the angle within the revolution sine wave. Although in this example, the fitted curve is only a first harmonic, B sin φ, higher harmonics may also be included.

The revolution correcting function may be stored in processing unit 14. Subsequently, when the position sensor takes a position measurement, the position measurement is corrected using the revolution correcting function by deducting the revolution correcting function from the position reading.

Both the described calibration mechanisms may be carried out on the position measurements, so that the position measurements are corrected using both the average pole pair correcting function and the revolution correcting function. Alternatively, only one of the calibration mechanisms may be carried out. This single calibration mechanism may be either the average pole pair correcting mechanism or the revolution correcting mechanism.

The calibration mechanisms can be carried out once the magnetic disc is mounted to the revolute joint or other elements whose relative rotation are being sensed in the articulated structure. By carrying out the calibration at this stage, errors introduced during assembly of the position sensor in place (for example when aligning the magnetic sensor assembly over the magnetic disc) as well as those introduced during manufacture may be detected and compensated for. The sensor may be re-calibrated in use, using the calibration mechanisms described above. The calibration mechanisms may be carried out during manufacture, and the position sensor supplied with the described correcting functions, which are stored in processing unit 14 and subsequently applied to measured position readings during use. In the field of robotics, and particularly surgical robotics, it is desirable for the robot arm to be as small and light as possible. The position sensors used on each joint of the robot arm are also preferably small and light. For example, disc 3 may be made of aluminium. In this field, magnetizing the disc in-situ on the robot arm is impractical. Due to the compact nature of the robot arm, there is insufficient space to apply a standard magnetization jig around the robot arm in order to magnetize the disc. Additionally, a magnetic back plate to the disc is used during magnetization in order to magnetize the disc. For example, steel is used as this back plate. In order to magnetize the disc in-situ, the disc would need to be made of steel or another magnetic material. This would preclude making the disc of a lightweight material such as aluminium. Thus, the disc is not magnetized in-situ, but instead the measures described herein are taken to replicate the magnetization jig environment at the articulated structure in order to compensate for errors introduced during manufacture.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present invention may consist of any such individual feature or combination of features. In view of the foregoing description it will be evident to a person skilled in the art that various modifications may be made within the scope of the invention.

What is claimed is:

1. A method of correcting a position reading from a position sensing arrangement, the position sensing arrangement comprising a disc having a magnetic ring with magnetic pole pairs and a magnetic sensor assembly comprising a magnetic sensor array configured to detect the magnetic pole pairs of the magnetic ring, the method comprising:
    for each pole pair of the magnetic ring, taking a calibration pole pair position reading with the magnetic sensor array, and generating a pole pair correcting function by comparing the calibration pole pair position reading with a model pole pair position reading, the model pole pair position reading being a theoretical sensor reading;
    for each pole pair of the magnetic ring, generating a corrected calibration pole pair position reading by deducting the pole pair correcting function from the calibration pole pair position reading;
    generating a revolution correcting function by comparing the corrected calibration pole pair position readings for the magnetic ring with model revolution position readings, the model revolution position readings being theoretical sensor readings;
    taking a position reading with the magnetic sensor array; and
    generating a corrected position reading by:
        deducting the revolution correcting function from the position reading.

2. A method as claimed in claim 1, wherein the calibration pole pair position reading is multi-bit.

3. A method as claimed in claim 1, wherein the revolution correcting function comprises a periodically oscillating function.

4. A method as claimed in claim 3, wherein the revolution correcting function comprises a sinusoidal function.

5. A method as claimed in claim 1, comprising generating the revolution correcting function by fitting a curve to the corrected calibration pole pair position readings, and deducting a line representing the model revolution position readings from the fitted curve.

6. A method as claimed in claim 5, comprising fitting the curve to the corrected calibration pole pair position readings using a method of least squares.

7. A method as claimed in claim 1 wherein the disc comprises a further magnetic ring with magnetic pole pairs, and the magnetic sensor assembly comprises a further magnetic sensor array configured to detect the magnetic pole pairs of the further magnetic ring, the method comprising:
    for each pole pair of the further magnetic ring, taking a further calibration pole pair position reading with the further magnetic sensor array, and generating a further pole pair correcting function by comparing the further calibration pole pair position reading with a further model pole pair position reading, the further model pole pair position reading being a theoretical sensor reading;
    for each pole pair of the further magnetic ring, generating a further corrected calibration pole pair position reading by deducting the further pole pair correcting function from the further calibration pole pair position reading;
    generating a further revolution correcting function by comparing the further corrected calibration pole pair position readings for the further magnetic ring with further model revolution position readings, the further model revolution position readings being theoretical sensor readings;
    taking a further position reading with the further magnetic sensor array; and
    generating a further corrected position reading by:
        deducting the further revolution correcting function from the further position reading.

8. A method as claimed in claim 7, wherein the further revolution correcting function comprises a periodically oscillating function.

9. A method as claimed in claim 8, wherein the further revolution correcting function comprises a sinusoidal function.

10. A method as claimed in claim 7, comprising generating the further revolution correcting function by fitting a curve to the further corrected calibration pole pair position readings, and deducting a line representing the further model revolution position readings from the fitted curve.

11. A method as claimed in claim 10, comprising fitting the curve to the further corrected calibration pole pair position readings using a method of least squares.

* * * * *